US012574350B2

(12) United States Patent
Venkata Ramana Ramalingam et al.

(10) Patent No.: US 12,574,350 B2
(45) Date of Patent: Mar. 10, 2026

(54) METHODS, SYSTEMS, AND APPARATUSES FOR DETERMINING NETWORK IDENTIFIERS

(71) Applicant: Comcast Cable Communications, LLC, Philadelphia, PA (US)

(72) Inventors: Ganesh Babu Venkata Ramana Ramalingam, Philadelphia, PA (US); Yeqing Wang, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 94 days.

(21) Appl. No.: 18/426,759

(22) Filed: Jan. 30, 2024

(65) Prior Publication Data

US 2025/0247358 A1     Jul. 31, 2025

(51) Int. Cl.
| | |
|---|---|
| *H04L 61/5046* | (2022.01) |
| *H04L 9/08* | (2006.01) |
| *H04L 61/5007* | (2022.01) |
| *H04L 67/55* | (2022.01) |
| *H04L 101/622* | (2022.01) |

(52) U.S. Cl.
CPC ........ *H04L 61/5046* (2022.05); *H04L 9/0891* (2013.01); *H04L 61/5007* (2022.05); *H04L 67/55* (2022.05); *H04L 2101/622* (2022.05)

(58) Field of Classification Search
CPC .............. H04L 61/5046; H04L 9/0891; H04L 61/5007; H04L 67/55; H04L 2101/622
USPC ....................................................... 709/231
See application file for complete search history.

(56) References Cited

U.S. PATENT DOCUMENTS

| | | | |
|---|---|---|---|
| 7,277,416 B1 | 10/2007 | Chang et al. | |
| RE42,078 E | 1/2011 | Yao et al. | |
| 9,124,585 B1 * | 9/2015 | Yen ........................ | H04L 61/103 |
| 10,965,637 B1 * | 3/2021 | Nayak ................. | H04L 61/5007 |
| 11,456,987 B1 * | 9/2022 | McKim ................. | H04L 61/5007 |
| 11,799,826 B1 * | 10/2023 | Lough ................. | H04L 61/5061 |
| 12,218,959 B2 * | 2/2025 | Moore ................ | H04L 63/1425 |
| 12,340,240 B1 * | 6/2025 | Goodell .............. | H04L 61/5061 |
| 2016/0173441 A1 * | 6/2016 | Lee ........................ | H04L 5/0055 |
| | | | 709/220 |
| 2016/0248732 A1 * | 8/2016 | Kolesnik .............. | H04L 61/5061 |
| 2017/0195260 A1 * | 7/2017 | Ma ........................ | H04L 45/7453 |
| 2017/0223046 A1 * | 8/2017 | Singh ................... | H04L 63/1491 |
| 2017/0310705 A1 * | 10/2017 | Gopalakrishna .... | H04L 41/0886 |
| 2017/0353491 A1 * | 12/2017 | Gukal ................. | H04L 63/1491 |
| 2018/0191571 A1 * | 7/2018 | Roychoudhury ..... | H04L 43/026 |
| 2018/0191677 A1 * | 7/2018 | Roychoudhury ... | H04L 61/5046 |
| 2018/0191872 A1 * | 7/2018 | Sarikaya ................ | H04L 69/18 |
| 2020/0213269 A1 * | 7/2020 | Nayak ................. | H04L 61/5092 |
| 2021/0075633 A1 * | 3/2021 | Sen ..................... | G06F 12/1081 |
| 2022/0060498 A1 * | 2/2022 | Head, Jr. ............. | H04L 12/4641 |

(Continued)

FOREIGN PATENT DOCUMENTS

| | | | | |
|---|---|---|---|---|
| CN | 112003965 A | * | 11/2020 | ......... H04L 61/5046 |

*Primary Examiner* — Karen C Tang
(74) *Attorney, Agent, or Firm* — Ballard Spahr LLP

(57) ABSTRACT

Methods, apparatuses, and systems are described for determining network devices associated with old, incorrect, or conflicting internet protocol (IP) addresses. A determination may be made that multiple network devices are associated with an IP address. The network device that is supposed to be associated with the IP address may be determined. The association between the IP address and the other network devices may be discontinued.

40 Claims, 11 Drawing Sheets

400

410
RECEIVE A DEVICE IDENTIFIER AND FIRST IP ADDRESS ASSOCIATED WITH THE FIRST NETWORK DEVICE

420
DETERMINE THE FIRST IP ADDRESS CONFLICTS WITH A SECOND IP ADDRESS ASSOCIATED WITH A SECOND NETWORK DEVICE

430
DETERMINE THE FIRST IP ADDRESS IS ASSIGNED TO THE FIRST NETWORK DEVICE

440
CAUSE THE FIRST IP ADDRESS TO BE REMOVED FROM THE SECOND NETWORK DEVICE

(56)                    References Cited

U.S. PATENT DOCUMENTS

| | | | |
|---|---|---|---|
| 2023/0171191 A1* | 6/2023 | Ignatchenko | H04L 69/16 |
| | | | 370/392 |
| 2025/0047635 A1* | 2/2025 | Goldschmidt | H04L 61/5061 |
| 2025/0047715 A1* | 2/2025 | Rogers | H04L 63/0209 |

* cited by examiner

400

410

RECEIVE A DEVICE IDENTIFIER AND FIRST IP ADDRESS ASSOCIATED WITH THE FIRST NETWORK DEVICE

420

DETERMINE THE FIRST IP ADDRESS CONFLICTS WITH A SECOND IP ADDRESS ASSOCIATED WITH A SECOND NETWORK DEVICE

430

DETERMINE THE FIRST IP ADDRESS IS ASSIGNED TO THE FIRST NETWORK DEVICE

440

CAUSE THE FIRST IP ADDRESS TO BE REMOVED FROM THE SECOND NETWORK DEVICE

500

510
RECEIVE A FIRST IP ADDRESS ASSOCIATED WITH A FIRST NETWORK DEVICE

520
DETERMINE THE FIRST IP ADDRESS IS ASSOCIATED WITH A SECOND NETWORK DEVICE

530
DETERMINE THE FIRST IP ADDRESS IS ASSIGNED TO THE SECOND NETWORK DEVICE

540
CAUSE THE FIRST IP ADDRESS TO BE REMOVED FROM THE FIRST NETWORK DEVICE

FIG. 6

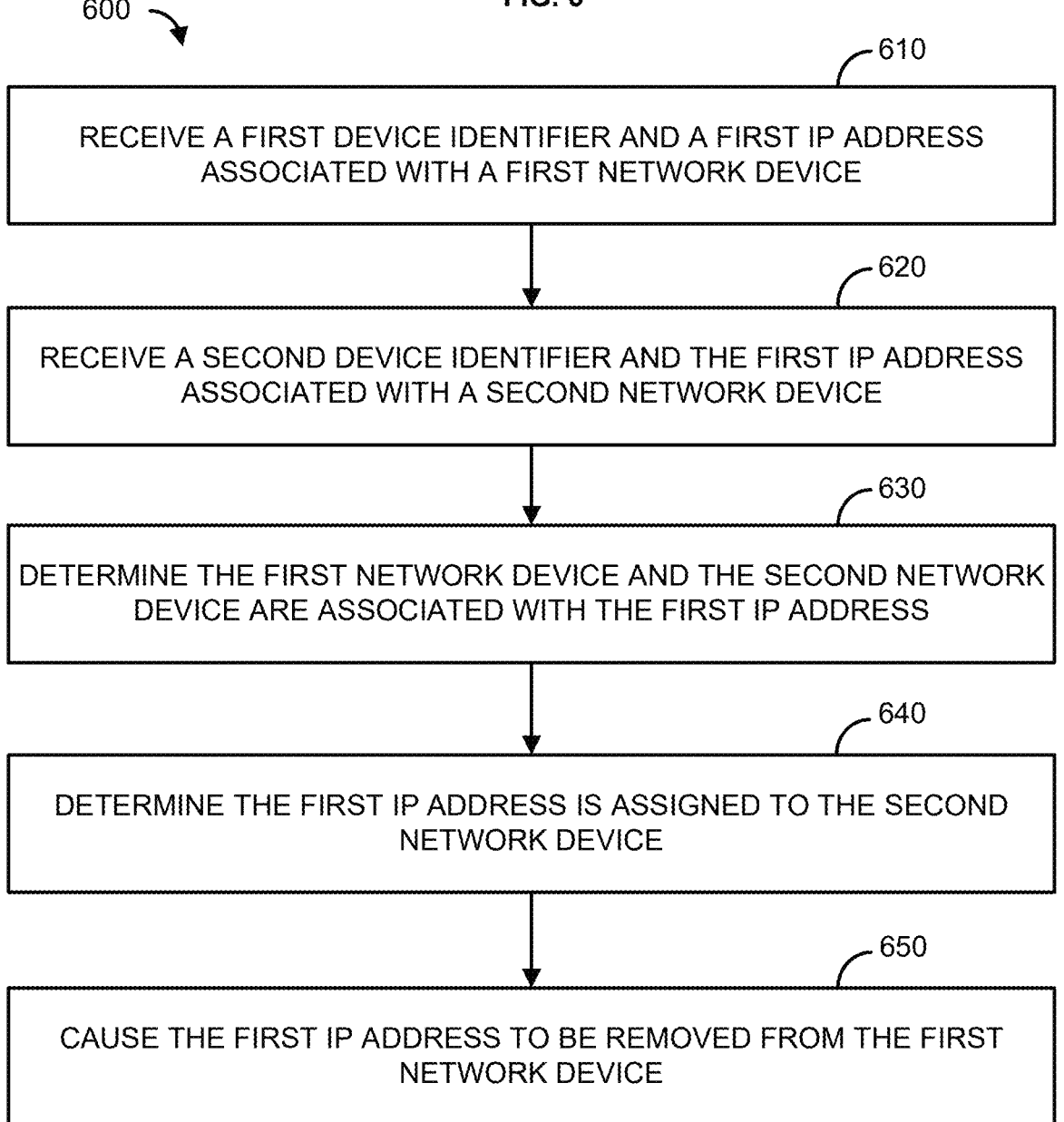

600

610
RECEIVE A FIRST DEVICE IDENTIFIER AND A FIRST IP ADDRESS ASSOCIATED WITH A FIRST NETWORK DEVICE

620
RECEIVE A SECOND DEVICE IDENTIFIER AND THE FIRST IP ADDRESS ASSOCIATED WITH A SECOND NETWORK DEVICE

630
DETERMINE THE FIRST NETWORK DEVICE AND THE SECOND NETWORK DEVICE ARE ASSOCIATED WITH THE FIRST IP ADDRESS

640
DETERMINE THE FIRST IP ADDRESS IS ASSIGNED TO THE SECOND NETWORK DEVICE

650
CAUSE THE FIRST IP ADDRESS TO BE REMOVED FROM THE FIRST NETWORK DEVICE

700

800

810

RECEIVE AN IP ADDRESS QUERY COMPRISING A DEVICE IDENTIFIER FOR A NETWORK DEVICE

820

DETERMINE AN IP ADDRESS ASSIGNED TO THE NETWORK DEVICE ASSOCIATED WITH THE DEVICE IDENTIFIER

830

CAUSE ANOTHER IP ADDRESS TO BE REMOVED FROM THE NETWORK DEVICE

900

1000

1010

RECEIVE A DEVICE IDENTIFIER AND AN IP BLOCK SIZE ASSOCIATED WITH A NETWORK DEVICE

1020

DETERMINE A SIZE OF THE IP BLOCK IS INCORRECT

1030

CAUSING THE NETWORK DEVICE TO MODIFY THE SIZE OF THE IP BLOCK

METHODS, SYSTEMS, AND APPARATUSES FOR DETERMINING NETWORK IDENTIFIERS

BACKGROUND

A static IP block is a fixed set of IP addresses (e.g., static IP addresses) assigned to a particular user, customer, or client. For example, one or more IP addresses may be assigned or associated with a particular user, customer, or client. The user, customer, or client may be associated with a business. A local network device, such as a router, may be provisioned with or associated with the one or more static IP addresses. The local network device may be provided to the particular user, customer, or client for use. By provisioning or associating the local network device with the one or more IP addresses, when network traffic identifies one of those one or more IP addresses as a destination for a signal, message, or request, the signal, message, or request will be routed to that particular local network device and provided to a user device associated with the local network device.

Over time, users, customers, and/or clients may change or modify the local network device equipment suitable for them. This may result in the first local network device being taken out of service and/or subsequently being provided to another user, customer, or client. If the prior IP addresses provisioned on or associated with the first local network device were not removed or deprovisioned from the first local network device, subsequent use of the local network device by the new user, customer, or client may result in a conflict were multiple network devices (including the first network device) are provisioned or associated with the one or more of the same IP addresses. Identifying first local network device can be difficult and must be done manually by a technician checking each network device to determine which IP addresses are provisioned or associated with the particular network device and then removing them, if incorrect, from the IP block of that network device.

SUMMARY

It is to be understood that both the following general description and the following detailed description are exemplary and explanatory only and are not restrictive. Methods, systems, and apparatuses systems for analyzing content are described.

Systems and methods are described herein for determining network devices associated with old, incorrect, or conflicting internet protocol (IP) addresses. IP addresses associated with network devices may be determined. When conflicts exist where more than one network device is associated with the same IP address, a determination may be made as to which network device is supposed to be currently associated with the particular IP address and may deprovision other network devices that were also associated with the particular IP address.

A first internet protocol (IP) address and a device identifier may be received. The device identifier and the first IP address may be associated with a first network device. A determination may be made that the first IP address conflicts with a second IP address associated with a second network device. The determination may be based on the first IP address. A determination may be made that the first IP address is assigned to the first network device. Based on the first IP address being assigned to the first network device, the second network device may be caused to remove the first IP address from the second network device.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIG. 6 shows a flowchart of an example method;

DETAILED DESCRIPTION

Figure 1:
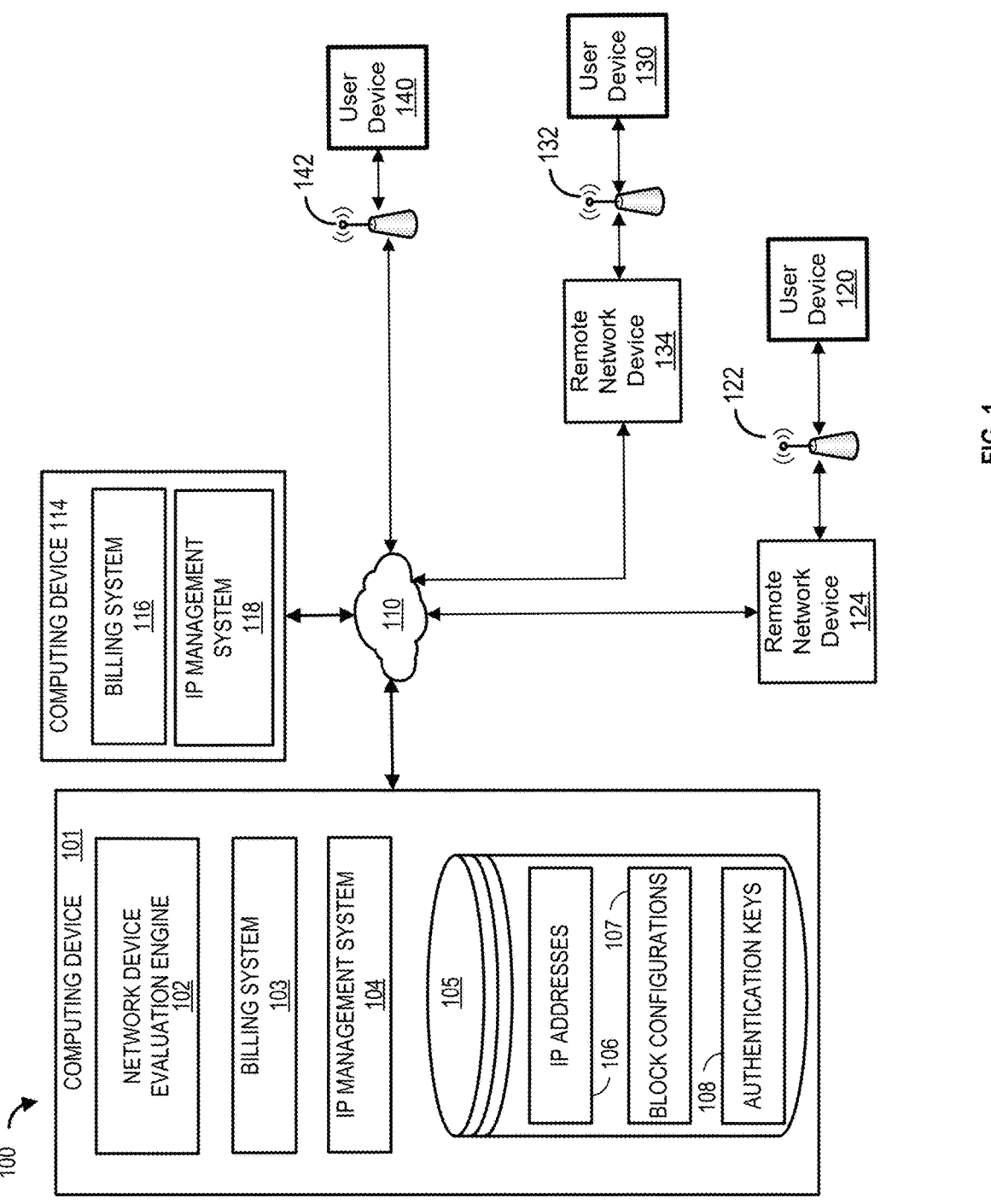
FIG. 1 shows an example system for identifying network identifiers.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content," as the phrase is used herein, may also be referred to as "content items," "content data," "content information," "content asset," or simply "data" or "information". Content may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to Moving Pictures Experts Group (MPEG), MPEG2, MPEG4 UHD, HDR, 4 k, Adobe® Flash® Video (.FLV) format or some other video file format whether such format is presently known or developed in the future. The content described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content may be any combination of the above-described formats.

This detailed description may refer to a given entity performing some action. It should be understood that this language may in some cases mean that a system (e.g., a computer) owned and/or controlled by the given entity is actually performing the action.

Methods, systems and apparatuses are described herein for determining when multiple network devices have been associated with or provisioned with the same IP address (e.g., a static IP address) and to cause the removal of the IP address from at least one of the network devices. The methods, systems, and apparatuses described herein may be employed to evaluate information received from network devices. Based on the information, the IP addresses associated with each network device may be determined. Duplicate IP addresses (e.g., network identifiers or device identifiers) across more than one network device may be identified. The methods, systems, and apparatuses described herein determine which network device is supposed to be associated with the IP address and take action to have the IP address removed from the other network device or devices.

FIG. 1 shows an example system 100 for determining duplicate network identifiers or device identifiers (e.g., indicating duplicate network routes) associated with network devices. The system 100 may be configured to operate as one or more of a content delivery network, a data network, a content distribution network, a combination thereof, and/or the like. The system 100 may include a computing device 101 in communication with a plurality of other devices via a network 110. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 110 via a variety of transmission paths, including wireless paths (e.g., satellite paths, Wi-Fi paths, cellular paths, near-field communication paths, etc.) and terrestrial paths (e.g., wired paths, a direct feed source via a direct line, etc.).

The system 100 may comprise a computing device 101. The computing device 101 may be configured to communicate with one or more other computing devices via the network 110. For example, the computing device 101 may be configured to communicate with one or more of the computing device 114, the remote network devices 124, 134, the local network devices 122, 132, 142, and/or the user devices 120, 130, 140 via the network 110 or another network. For example, the computing device 101 may communicate with the user devices 120, 130, 140 to provide data and/or services. For example, the computing device 101 may provide services, such as network (e.g., Internet) connectivity, network printing, media management (e.g., media server), content services, streaming services, broadband services, or other network-related services. For example, the computing device 101 may be distributed or disposed at a central location (e.g., a headend, or processing facility). The computing device may receive content (e.g., data, input programming) from multiple sources, combine the content from the multiple sources, and distribute the content via the network 110 or another network via a distribution system. The computing device 101 may comprise a server. For example, the computing device 101 may comprise a cloud-based server.

The computing device 101 may comprise a network device evaluation engine 102. The network device evaluation engine 102 may comprise one or more applications, programs, or programming for evaluating information regarding network devices, such as network devices the computing device 101 may communicate with via the network 110 or another network. For example, the network device evaluation engine 102 may be configured to receive notifications from or about one or more network devices, such as the network devices 122, 132. For example, the notifications may comprise push notifications. For example, the notifications may be one or more of a webpa notification or a routing information protocol (RIP)v2 update message. The notification may comprise a device identifier (e.g. MAC address) identifying or associated with the network device, one or more IP addresses (e.g., static IP addresses) associated with or provisioned to the particular network device, the block sizes of those one or more IP addresses, an authentication key associated with the network device, and a time the network device was configured. The notification may comprise additional information. The network device evaluation 102 engine may be configured to receive the notifications via the network 110 or another network.

The network device evaluation engine 102 may determine information from each notification. For example, the network device evaluation engine 102 may determine the device identifier (e.g., MAC address) associated with the network device that sent the notification, the one or more IP addresses (e.g., static IP addresses) associated with or provisioned to the particular network device, the block sizes of those IP addresses, an authentication key associated with the network device, and a time the network device was configured. The network device evaluation engine 102 may be configured to store one or more portions of the information determined from the notification in a database, such as the database 105. While the database 105 is shown as being part of the computing device 101, this is for example purposes only, as the database may one or more databases that are part of, proximate to, or remote from the computing device 101 and communicably coupled or accessible to the computing device 101.

For example, the network device evaluation engine 101 may store the one or more IP addresses associated with or provided to the particular network device in an IP addresses 106 portion of the database 105. The stored IP addresses may be associated with the device identifier for the particular network device in the IP addresses 106 portion of the database 105. For example, the network device evaluation engine 102 may store the block sizes for the particular IP addresses for the particular network device in a block configuration 107 portion of the database 105. For example, the block sizes may be associated with the device identifier for the particular network device and with the particular IP addresses that the block sizes are associated with in the block configuration 107 portion of the database 105. For example, the network device evaluation engine 102 may store the authentication key for the network device in the authentication keys 108 portion of the database 105. For example, the stored authentication keys may be associated with the device identifier for the particular network device in the authentication keys 108 portion of the database 105.

The network device evaluation engine 102 may also determine if any duplicate IP addresses (e.g., static IP addresses) received in the notification are associated with another network device (e.g., another router). For example, the network device evaluation engine 102 may compare each of the one or more IP addresses in the notification to the stored listing of IP addresses in, for example, the IP addresses 106 portion of the database 105 to determine if any of the stored IP address match or conflict with the IP address in the notification and is associated with a different network device (e.g., based on having a different device identifier). The network device evaluation engine 102 may determine that the IP address (e.g., static IP addresses) from the notification is associated with a least two network devices (e.g., the network device that sent the notification and at least one network device associated with the stored IP address that matches the IP address in the notification). The network device evaluation engine 102 may, based on the determination of a match of the IP addresses, send the device identifiers for network devices having the matching IP addresses to the billing system 103, 116 for further analysis.

The computing device 101 may comprise a billing system 103. The billing system 103 may comprise one or more applications, programs, or programming for storing client or customer billing information, recording billing activities of the clients/customers, and generating bills for distribution to the clients/customers. For example, the billing system 103 may comprise a database. For example, the client or customer billing information may comprise a unique account identifier (e.g., an account number) associated with each client/customer account. For example, the client or customer billing information may also comprise the device identifiers of one or more network devices (e.g., routers, gateways, etc.) being used by or associated with the particular client/customer. The client or customer billing information may also include additional information, including, but not limited to a client address, a client email, and historical billing information for the client.

The billing system 103 may receive the device identifiers for the network devices having the matching IP addresses from the network device evaluation engine 102. The billing system 103 may compare each device identifier (e.g., MAC address) to its database of client or customer billing information to determine the account identifier associated with (e.g., that includes) the particular device identifier. The billing system 103 may do this for each of the device identifiers provided to the billing system 103 by the network device evaluation engine 102. The billing system 103 may then send or otherwise provide the account identifiers and device identifiers to the IP management system 104, 118.

The computing device 101 may comprise an IP management system 104. The IP management system 104 may comprise one or more applications, programs, or programming for storing and evaluating client or customer IP address information. For example, the IP management system 104 may comprise a database. For example, the IP address information may comprise a unique account identifier (e.g., an account number) associated with each client/customer account and the IP addresses (e.g., static IP addresses) assigned to each particular client/customer account. The IP management system 104 may receive the device identifiers and the account identifiers associated with the accounts for the clients or customers using or associated with the network devices having the matching IP addresses from the billing system 103. The IP management system 104 may compare each account identifier (e.g., account number) to its database of IP address information to determine the one or more IP addresses assigned to or associated with the particular account identifier. The IP management system 104 may do this for each of the account identifiers provided to the IP management system 104 by the billing system 103. The IP management system 104 may then send or otherwise provide the one or more IP addresses assigned to or associated with each particular account identifier and the one or more associated device identifiers to the network device evaluation engine 102.

The network device evaluation engine 102 may compare the one or more IP addresses associated with each particular device identifier to the stored IP address information to determine which network device (e.g., which device identifier for the network device) of the multiple network device is correctly assigned the IP address for which multiple network devices were associated. The network device evaluation engine 102 or another portion of the computing device 101 may then determine or create a deprovisioning message that instructs a network device to remove or stop being associated with the particular IP address. The network device evaluation engine 102 or another portion of the computing device 101 may send or cause to be sent the deprovisioning message to the one or more network devices that are not correctly assigned the IP address but that were associated or provisioned with the IP address.

In certain examples, the billing system 103 and the IP management system 104 may not be part of the computing device 101 but may be part of another computing device 114 in communication with the computing device 101. For example, the computing device 114 may communicate with the computing device 101 (e.g., the network device evaluation engine 102) via the network 110 or another network. The example, the computing device 114 may comprise a server. For example, the computing device 114 may comprise a cloud-based server. For example, the computing device 114 may comprise a back-office server.

For example, the computing device 114 may comprise the billing system 116. For example, the billing system 116 is substantially the same as and operates substantially the same as the billing system 103 of the computing device 101. For example, the computing device 114 may comprise the IP management system 118. For example, the IP management system 118 is substantially the same as and operates substantially the same as the IP management system 104 of the computing device 101.

The system 100 may comprise one or more user devices, such as user devices 120, 130, 140. For example, each user device 120, 130, 140 can be an electronic device such as a personal computer, computing station (e.g., workstation), portable computer (e.g., laptop, mobile phone, tablet device), smart television, a server, a network computer, or other device capable of communicating with a local network device, such as local network devices 122, 132, 142. As an example, each user device 120, 130, 140 can comprise a communication element for providing an interface to a user to interact with the user device 120, 130, 140 and/or the computing device 101. The communication element can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 120, 130, 140 and the computing device 101. As an example, the communication element can request or query various files from a local source and/or a remote source. As a further example, the communication element can transmit data to a local or remote device such as the computing device 101.

For example, the user device 120, 130, 140 may be associated with a user identifier or a device identifier. For example, the device identifier may be any identifier, token, character, string, or the like, for differentiating one user device (e.g., user device 120, 130, 140) from another user device. Other information may be represented by the device identifier.

For example, the device identifier may comprise an address element and a service element. The address element may comprise or provide an internet protocol address, a network address, a media access control (MAC) address, an Internet address, or the like. For example, the address element may be relied upon to establish a communication session between the user device 120, 130, 140 and other computing devices and/or networks. As a further example, the address element may be used as an identifier of the user device 120, 130, 140.

For example, the service element may comprise an identification of a service provider associated with the user device 120, 130, 140 and/or with the class of user device 120, 130, 140. The class of the user device 120, 130, 140 may be related to a type of device, capability of device, type of service being provided, and/or a level of service (e.g., business class, service tier, service package, etc.). As an example, the service element may comprise information relating to or provided by a communication service provider (e.g., Internet service provider) that is providing or enabling data flow such as communication services to the user device 120, 130, 140.

The system 100 may comprise one or more local network devices 122, 132, 142. As will be appreciated by one skilled in the art, the system 100 may have any quantity of local network devices. For example, each local network device 122, 132, 142 may be located at a location of a client or customer, such as a location of a business, premises, or residence. For example, each local network device 122, 132, 142 may be a wired or wireless communication device (e.g., a router, a gateway, a node, etc.). Each local network device 122, 132, 142 may utilize one or more communication protocols to communicate on one or more network, such as the network 110 or another wired or wireless network. For example, each of the network devices 122, 132, 142 may utilize a Wi-Fi communication protocol. For example, each of the network devices 122, 132, 142 may be configured with one or more Service Set Identifiers (SSIDs) (e.g., associated with a user network or private network) to function as a local network for a particular user or user device 120, 130, 140.

The system 100 may comprise one or more remote network devices 124, 134. As will be appreciated by one skilled in the art, the system 100 may have any quantity of remote network devices. For example, each remote network device 124, 134 may be located remote or away from a client or customer, such as remote from the location of a business, premises, or residence. Each remote network device 124, 134 may be configured as an intermediary between the local network devices 122, 132, 142 (e.g., routers, cable modems, multimedia terminal adapters (MTA), network terminals, etc.) and a backbone network/portion (e.g. the Internet) of the network 110. Each remote network device 124, 134 may forward/send data received from a backbone network, such as network 110 to the local network devices 122, 132, 142 and forward data received from the local network devices 122, 132, 142 onto the network 110. Each remote network device 124, 134 may comprise an optical transmitter and an optical receiver for transmitting and/or receiving messages from the local network devices 122, 132, 142. Each remote network device 124, 134 may include transmitters and/or receivers for communicating with the network 110. Each remote network device 124, 134 may include a converter that may convert any protocol used within the network 110 to a protocol suitable for data communication with the local network devices 122, 132, 142. For example each remote network device 124, 134 may send/transmit signals (e.g., data signals, media signals, broadband signals, content signals, etc.) downstream to the local network devices 122, 132, 142 via a connection/communication link to a node supporting the local network devices 122, 132, 142. For example, each remote network device 124, 134 may be or comprise a cable modem termination system (CMTS), an optical line termination (OLT), or a digital subscriber line access multiplexer (DSLAM), etc.

Figure 2:
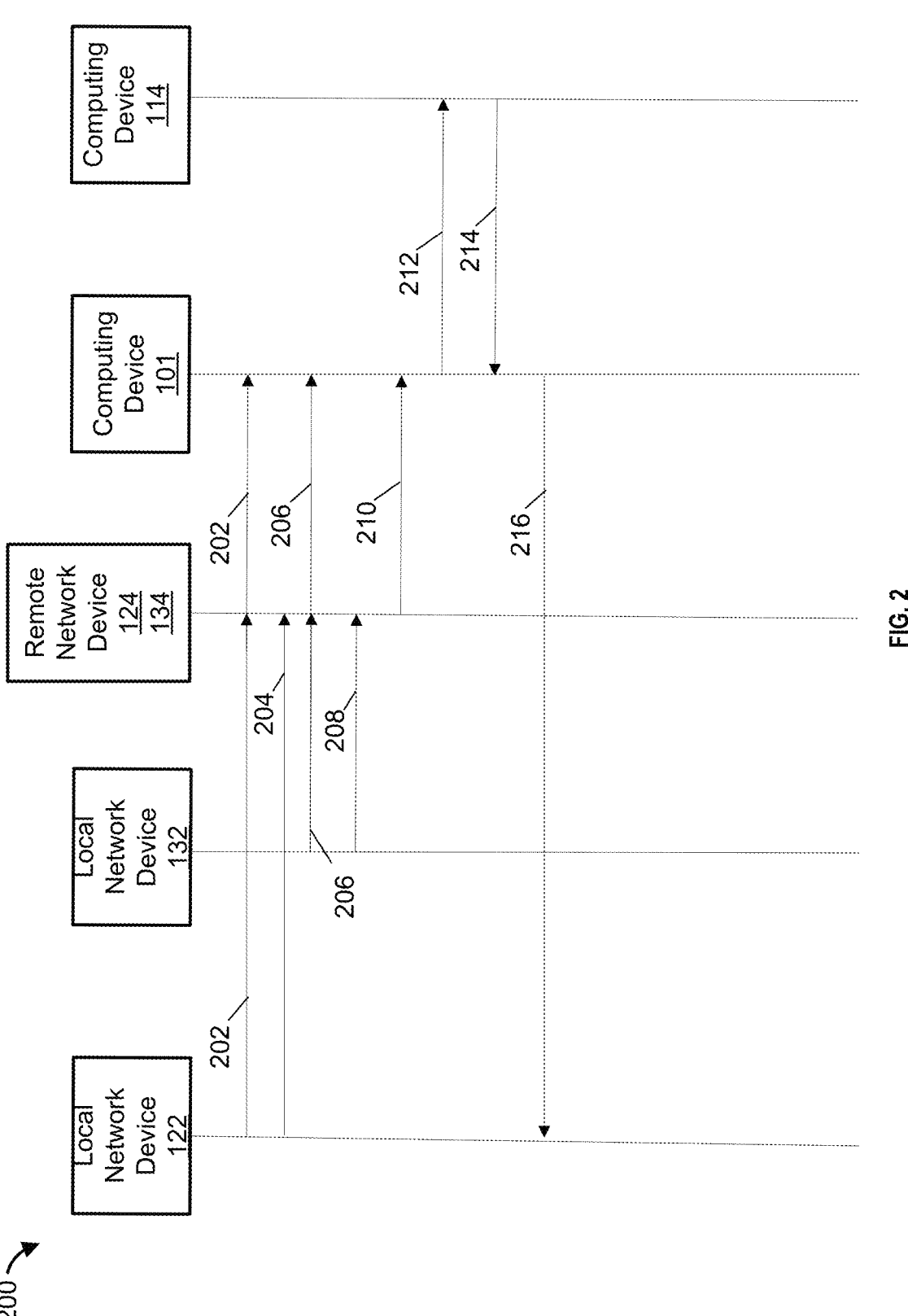
FIG. 2 shows an example communication diagram for identifying network identifiers.

FIG. 2 shows an example communication method 200 for identifying duplicate network identifiers or device identifiers (e.g., indicating duplicate network routes). The example communication method 200 may include one or more computing devices, such as one or more local network devices 122, 132; one or more remote network devices 124, 134; a computing device 101; and/or a back office computing device 114. While certain actions are shown as being completed by certain devices within the example method 200, this is for example purposes only, as any of the devices described herein may complete any one or all of the elements described herein. Each of the computing devices 101, 114, 122, 124, 132, 134 may be configured to send signals or messages comprising data to another one of the computing devices. The data may comprise one or more of messages, information, audio data, video data, audio-video data, content data, website data, and/or the like.

A signal or message 202 may be sent. The signal or message may be sent by the first local network device 122 associated with the first user device 120 at the first location. The first location may be a premises, such as a business premises, an office for a business, or a computing center for a business. In certain examples, the business may be one located at a residence. The first local network device 122 may be located at the first location. The signal or message 202 may be sent by the first local network device 122 to the computing device 101 via the network 110 or another network. For example, the signal or message 202 may be sent to the computing device 101 via the remote network device 124.

For example, the first local network device 122 may comprise a router. For example, the first local network device 122 may comprise a business router. The first local network device 122 may be provisioned with one or more network addresses, such as one or more static internet protocol (IP) addresses associated with a business at the first location. For example, the user device 120 may be hosting a web server associated with the first business at the first location and associated with one or more of the static IP addresses. For example the static IP address remains associated with the first local network device 122 over time and directs Internet or Intranet traffic associated with one of the provisioned static IP addresses to the user device 120.

For example, the signal or message 202 may comprise the one or more static IP addresses (e.g., a first IP address) provisioned or associated with the first local network device 122. For example, the signal or message 202 may comprise, the one or more static IP addresses provisioned or associated with the first local network device 122, an authentication key associated with the first local network device 122, a MAC address identifying or associated with the first local network device 122, the block size for each static IP address provisioned or associated with the first local network device 122, and/or a time the first local network device 122 was configured. For example, the signal or message 202 may be a push notification from the first local network device 122. For example, the signal or message 202 may comprise a webpa push notification. For example, the signal or message 202 may be sent without the first local network device 122 receiving a corresponding request for the information in the signal or message 202. The signal or message 202 may be sent by the first local network device when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed.

The computing device 101 may receive the signal or message 202. The computing device 101 may evaluate the signal or message 202 to identify the information within the signal or message 202 and record or store certain portions of the signal or message 202. For example, the computing device 101 may determine the static IP addresses associated with the first local network device 122 in the message 202 and may store an association of the static IP addresses to the first local network device 122 (e.g., the MAC address for the first local network device 122) in a database, such as the IP addresses 106 portion of the database 105 of the computing device 101. For example, the computing device 101 may determine the block sizes and/or configurations for the static IP addresses associated with the first local network device 122 in the message 202 and may store an association of the block sizes and/or configurations for the static IP addresses to the first local network device 122 (e.g., the MAC address for the first local network device 122) in a database, such as the block configurations 107 portion of the database 105 of the computing device 101. For example, the computing device 101 may determine the current authentication key and authentication time associated with the first local network device 122 in the message 202 and may store an association of the authentication key and authentication time to the first local network device 122 (e.g., the MAC address for the first local network device 122) in a database, such as the authentication keys 108 portion of the database 105 of the computing device 101.

A signal or message 204 may be sent. The signal or message may be sent by the first local network device 122 associated with the first user device 120 at the first location. The signal or message 204 may be sent by the first local network device 122 to the remote network device 124 via the network 110 or another network. For example, the remote network device 124 may comprise a cable modem termination system (CMTS), an optical line termination (OLT), or a digital subscriber line access multiplexer (DSLAM), etc. The remote network device 124 may be located remote from the first location.

For example, the signal or message 204 may comprise the one or more of the one or more static IP addresses provisioned or associated with the first local network device 122, the authentication key associated with the first local network device 122, the device identifier (e.g., the MAC address) identifying or associated with the first local network device 122, the block size for each static IP address provisioned or associated with the first local network device 122, and/or a time the first local network device 122 was configured. For example, the signal or message 204 may be a push notification from the first local network device 122. For example, the signal or message 204 may comprise a Routing Information Protocol (RIP)v2 update message. For example, the signal or message 204 may be sent without the first local network device 122 receiving a corresponding request for the information in the signal or message 204. For example, the signal or message 204 may be sent periodically without being requested by the computing device 101. For example, the signal or message 204 may be sent once every 30 seconds or any other time period desired.

The remote network device 124 may receive the signal or message 204. The remote network device 124 may evaluate the signal or message 204 to identify the information within the signal or message 204 and record or store certain portions of the signal or message 204. For example, the remote network device 124 may determine the static IP addresses associated with the first local network device 122 in the message 204 and may store an association of the static IP addresses to the first local network device 122 (e.g., the MAC address for the first local network device 122) in a routing table of the remote network device 124. The remote network device 124 may further evaluate the one or more static IP addresses associated with the first local network device 122 to determine if any other local network devices are associated with any one of the one or more static IP addresses identified in the signal or message 204. The remote network device 124 may compare each of the one or more static IP addresses in the message 204 to the static IP addresses in the routing table of the remote network device 124 to determine if any of the static IP addresses in the routing table match or are the same as the particular static IP address received in the signal or message 204. For example, more than one local network device 122 being associated with a static IP address would cause a network conflict, such that the remote network device 124 would not know which local network device to send a message or request indicating the particular static IP address.

A signal or message 206 may be sent. The signal or message 206 may be sent by the second local network device 132 associated with the second user device 130 at a second location different from the first location. The second location may be a premises, such as a business premises, an office for a business, or a computing center for a business. In certain examples, the business may be one located at a residence. The second local network device 132 may be located at the second location. The signal or message 206 may be sent by the second local network device 132 to the computing device 101 via the network 110 or another network. For example, the signal or message 206 may be sent to the computing device 101 via the remote network device 124 or the remote network 134.

For example, the second local network device 132 may comprise a router. For example, the second local network device 132 may comprise a business router. The second local network device 132 may be provisioned with one or more network addresses, such as one or more static IP addresses associated with the second business at the second location. For example, the user device 130 may be hosting a web server associated with the second business at the second location and associated with one or more of the static IP addresses. For example the static IP address directs Internet or Intranet traffic associated with one of the provisioned static IP addresses to the user device 130.

For example, the signal or message 206 may comprise the one or more static IP addresses (e.g., a second IP address) provisioned or associated with the second local network device 132. For example, the signal or message 206 may comprise, the one or more static IP addresses provisioned or associated with the second local network device 132, an authentication key associated with the second local network device 132, a MAC address identifying or associated with the second local network device 132, the block size for each static IP address provisioned or associated with the second local network device 132, and/or a time the second local network device 132 was configured. For example, the signal or message 206 may be a push notification from the second local network device 132. For example, the signal or message 206 may comprise a webpa push notification. For example, the signal or message 206 may be sent without the second local network device 132 receiving a corresponding request for the information in the signal or message 206. The signal or message 206 may be sent by the second local network device 132 when one or more of the following occur: the second local network device 132 is provided with a new static IP address, the second local network device 132 is rebooted or restarted, the second local network device 132 is initially coupled to or recoupled to the network 110 or another network, or network configurations for the second local network device 132 are changed.

The computing device 101 may receive the signal or message 206. The computing device 101 may evaluate the signal or message 206 to identify the information within the signal or message 206 and record or store at least certain portions of the signal or message 206. For example, the computing device 101 may determine the static IP addresses associated with the second local network device 132 in the message 206 and may store an association of the static IP addresses to the second local network device 132 (e.g., the MAC address for the second local network device 132) in a database, such as the IP addresses 106 portion of the database 105 of the computing device 101. For example, the computing device 101 may determine the block sizes and/or configurations for the static IP addresses associated with the second local network device 132 in the message 206 and may store an association of the block sizes and/or configurations for the static IP addresses to the second local network device 132 (e.g., the MAC address for the second local network device 132) in a database, such as the block configurations 107 portion of the database 105 of the computing device 101. For example, the computing device 101 may determine the current authentication key and authentication time associated with the second local network device 132 in the message 206 and may store an association of the authentication key and authentication time to the second local network device 132 (e.g., the MAC address for the second local network device 132) in a database, such as the authentication keys 108 portion of the database 105 of the computing device 101.

The computing device 101 may determine or identify a duplication of a network address (e.g., a static IP address). For example, the computing device 101 may determine that a first static IP address provisioned at and associated with the first local network device 122 is the same as a second static IP address provisioned at and associated with the second local network device 132. For example, the computing device 101 may compare the one or more static IP addresses received in the signal or message 206 to the stored static IP addresses provisioned at and associated with other local network devices to determine if the one or more static IP addresses received in the signal or message 206 is the same as any one or more of the stored static IP addresses in, for example the IP addresses 106 portion of the database. For example, the computing device 101 may determine that the first static IP address associated with the first local network device 122 matches or is the same as the second static IP address associated with the second local network device 132.

The computing device 101 may determine or cause to be determined which local network device 122, 132 should be associated with (e.g., is the correct current owner/user of) the first/second static IP address. For example, the computing device 101 may determine the device identifier (e.g., the MAC address) for each of the local network devices having the same static IP addresses. For example, the computing device 101 may determine or retrieve the device identifiers from the IP addresses 106 portion of the database 105 for each of the local network devices having the same static IP address. For example, the computing device 101 may send a signal or message 212 to the computing device 114. For example, the computing device 101 may send the signal or message 212 to the billing system 116 of the computing device 114. The signal or message 212 may comprise the device identifiers for the local network devices 122, 132 having the same static IP addresses.

The billing system 116 or another portion of the computing device 114 may receive the signal or message 212. For example, the billing system 116 may receive the device identifiers from the signal or message 212 and determine, based on the device identifier for the first local network device 122, account information associated with the first local network device 122. For example, the billing system 116 may determine, based on the device identifier for the second local network device 132, account information associated with the second local network device 132. For example, the account information may comprise an account number, a customer number, a customer name (e.g., a business name), a user ID, or the like.

The computing device 114 may determine the static IP addresses associated with each of the first local network device 122 and the second local network device 132. For example, the computing device 114, such as the IP management system 118, may determine the static IP addresses associated with the first local network device 122 based on the account information associated with the first local network device 122. For example, the IP management system 118 may determine, based on one or more of the account number, customer number, customer name, or user ID associated with the first local network device 122, user device 120 and/or business at the first location, the static IP addresses associated with the first local network device 122. For example, the computing device 114, such as the IP management system 118, may determine the static IP addresses associated with the second local network device 132 based on the account information associated with the second local network device 132. For example, the IP management system 118 may determine, based on one or more of the account number, customer number, customer name, or user ID associated with the second local network device 132, user device 130 and/or business at the second location, the static IP addresses associated with the second local network device 132.

The computing device 114 may determine if the current block size for the particular static IP address and/or the authentication key for the particular local network device 122, 132 are correct. For example, the computing device 114, such as the IP management system 118, may determine the correct block size for the particular static IP address and determine if the correct block size is different from the current block size for the particular static IP address associated with the first local network device 122 based on the account information associated with the first local network device 122. For example, the IP management system 118 may determine, based on one or more of the account number, customer number, customer name, or user ID associated with the first local network device 122, user device 120 and/or business at the first location, the correct block size for the particular static IP address and determine if the correct block size is different from the current block size for the particular static IP address associated with the first local network device 122. For example, the computing device 114, such as the IP management system 118, may determine the correct block size for the particular static IP address and determine if the correct block size is different from the current block size for the particular static IP address associated with the second local network device 132 based on the account information associated with the second local network device 132. For example, the IP management system 118 may determine, based on one or more of the account number, customer number, customer name, or user ID associated with the second local network device 132, user device 130 and/or business at the second location, the correct block size for the particular static IP address and determine if the correct block size is different from the current block size for the particular static IP address associated with the second local network device 132.

For example, the computing device 114, such as the IP management system 118, may determine the correct authentication key for the first local network device 122 and determine if the correct authentication key is different from the current authentication key for the first local network device 122 based on the account information associated with the first local network device 122. For example, the IP management system 118 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122. For example, the computing device 114, such as the IP management system 118, may determine the correct authentication key for the second local network device 132 and determine if the correct authentication key is different from the current authentication key for the second local network device 132 based on the account information associated with the second local network device 132. For example, the IP management system 118 may determine, based on one or more of the account number, customer number, customer name, or user ID associated with the second local network device 132, user device 130 and/or business at the second location, the correct authentication key for the second local network device 132 and determine if the correct authentication key is different from the current authentication key for the second local network device 132.

The computing device 114 and/or the computing device 101 may associate and store the correct static IP addresses, authentication key and the correct block size for each of the provisioned static IP addresses for the first local network device 122 and the second local network device 132 with a device identifier of the particular first local network device 122 or second local network device 132. For example, the correct IP addresses, authentication key, and the correct block size may be stored in the database 105 or another database associated with the computing device 114. For example, the computing device 114 may send a signal or message 214. The signal or message 214 may be sent to the computing device 101 via the network 110 or another network. The signal or message 214 may comprise an indication of the local network device 122, 132 that is correctly associated with the first/second static IP address and the local network device 122, 132 that is incorrectly associated with the first/second static IP address. The signal or message 214 may comprise one or more of the correct static IP addresses, correct block sizes for each static IP address, and/or correct authentication key associated with the first local network device 122 and/or one or more of the correct static IP addresses, correct block sizes for each static IP address, and/or correct authentication key associated with the second local network device 132.

The computing device 101 may receive the signal or message 214. As an example, the computing device 114 may have determined that the first local network device 122 is incorrectly associated with the first static IP address and the second local network device 132 is correctly associated with the first static IP address. The computing device 101 may determine, based on the signal or message 214, that a deprovisioning message 216 should be sent to the first local network device 122. For example, the computing device may determine the deprovisioning message 216 should be sent to the first local network device 122 based on the indication that the second local network device 132 is correctly associated with the first/second static IP address and/or the first local network device 122 is incorrectly associated with the first/second static IP address in the signal or message 214. The computing device 101 may generate a deprovisioning message 216 to remove the first static IP address from the first local network device 122. The deprovisioning message 216 may include an indication for the first local network device 122 to remove the first static IP address from or disassociate the first static IP address from the first local network device 122. The computing device 101 may send the deprovisioning message 216 to the first local network device 122 via the network 110 or another network.

The first local network device 122 may receive the deprovisioning message 216. Based on receiving the deprovisioning message 216, the first local network device 122 may remove the first static IP address as an address associated with the first local network device 122. The deprovisioning 216 message may further include, or the computing device 101 may send a separate message comprising the correct block size for each correct static IP address associated with the first local network device 122 and/or the correct authentication key for the first local network device 122. The first local network device 122 may receive the message 216 or the additional message and update the block sizes and/or authentication key at the first local network device 122.

The computing device 101 may send another message to the second local network device 132. For example, the message may comprise the correct block size for each correct static IP address associated with the second local network device 132 and/or the correct authentication key for the second local network device 132. The second local network device 132 may receive the message and update the block sizes and/or authentication key at the second local network device 132.

A signal or message 208 may be sent. The signal or message may be sent by the second local network device 132 associated with the second user device 130 at the second location. The signal or message 208 may be sent by the second local network device 132 to the remote network device 124 or 134 via the network 110 or another network. For example, the remote network device 124 or 134 may comprise a CMTS, an OLT, or a DSLAM, etc. The remote network device 124 or 134 may be located remote from the second location.

For example, the signal or message 208 may comprise one or more of the one or more static IP addresses provisioned or associated with the second local network device 132, the authentication key associated with the second local network device 132, the device identifier (e.g., the MAC address) identifying or associated with the second local network device 132, the block size for each static IP address provisioned or associated with the second local network device 132, and/or a time the second local network device 132 was configured. For example, the signal or message 208 may be a push notification from the second local network device 132. For example, the signal or message 208 may comprise a RIPv2 update message. For example, the signal or message 208 may be sent without the second local network device 132 receiving a corresponding request for the information in the signal or message 208. For example, the signal or message 208 may be sent periodically without being requested by the computing device 101. For example, the signal or message 208 may be sent once every 30 seconds or any other time period desired.

The remote network device 124/134 may receive the signal or message 208. The remote network device 124/134 may evaluate the signal or message 208 to identify the information within the signal or message 208 and record or store certain portions of the signal or message 208. For example, the remote network device 124/134 may determine the static IP addresses associated with the second local network device 132 in the message 208 and may store an association of the static IP addresses to the second local network device 132 (e.g., the MAC address for the second local network device 132) in a routing table of the remote network device 124/134. The remote network device 124/134 may further evaluate the one or more static IP addresses associated with the second local network device 132 to determine if any other local network devices are associated with any one of the one or more static IP addresses identified in the signal or message 208. The remote network device 124/134 may compare each of the one or more static IP addresses in the message 208 to the static IP addresses in the routing table of the remote network device 124/134 to determine if any of the static IP addresses in the routing table match or are the same as the particular static IP address received in the signal or message 208.

In certain examples, the computing device 101 may not determine, based on the signal or message 206 from the second local network device, that there is a conflict with two or more local network devices being associated and/or provisioned with the same static IP address. For example, the remote network device 124/134 may determine the conflict with the first static IP address associated with the first local network device 122 and the second static IP address associated with the second local network device 132 based on receiving the signal or message 208. For example, based on the comparison of each of the one or more static IP addresses in the message 208 to the static IP addresses in the routing table of the remote network device 124/134 the remote network device 124/134 may determine that the first static IP address associated with the first local network device 122 is the same as the second static IP address associated with the second local network device 132. Based on the determination of a conflict of the first static IP address associated with the first local network device 122 and the second static IP address associated with the second local network device 132, the remote network device 124/134 may send a signal or message 210 to the computing device 101. The signal or message 210 may indicate the conflict of the first static IP address associated with the first local network device 122 and the second static IP address associated with the second local network device 132. For example, the signal or message 210 may comprise the device identifier for the first local network device 122, the device identifier for the second local network device 132, and the first/second static IP address (e.g., since they are one and the same). For example, the signal or message 210 may also comprise the block size for each static IP address associated with the first local network device 122, the block size for each static IP address associated with the second local network device 132, the authentication key associated with the first local network device 122, and/or the authentication key associated with the second local network device 132. The computing device 101 may receive the signal or message 210 and may take actions similar to those discussed above upon receiving the signal or message 206 to evaluate and correct the conflict of the static IP addresses.

Figure 3:
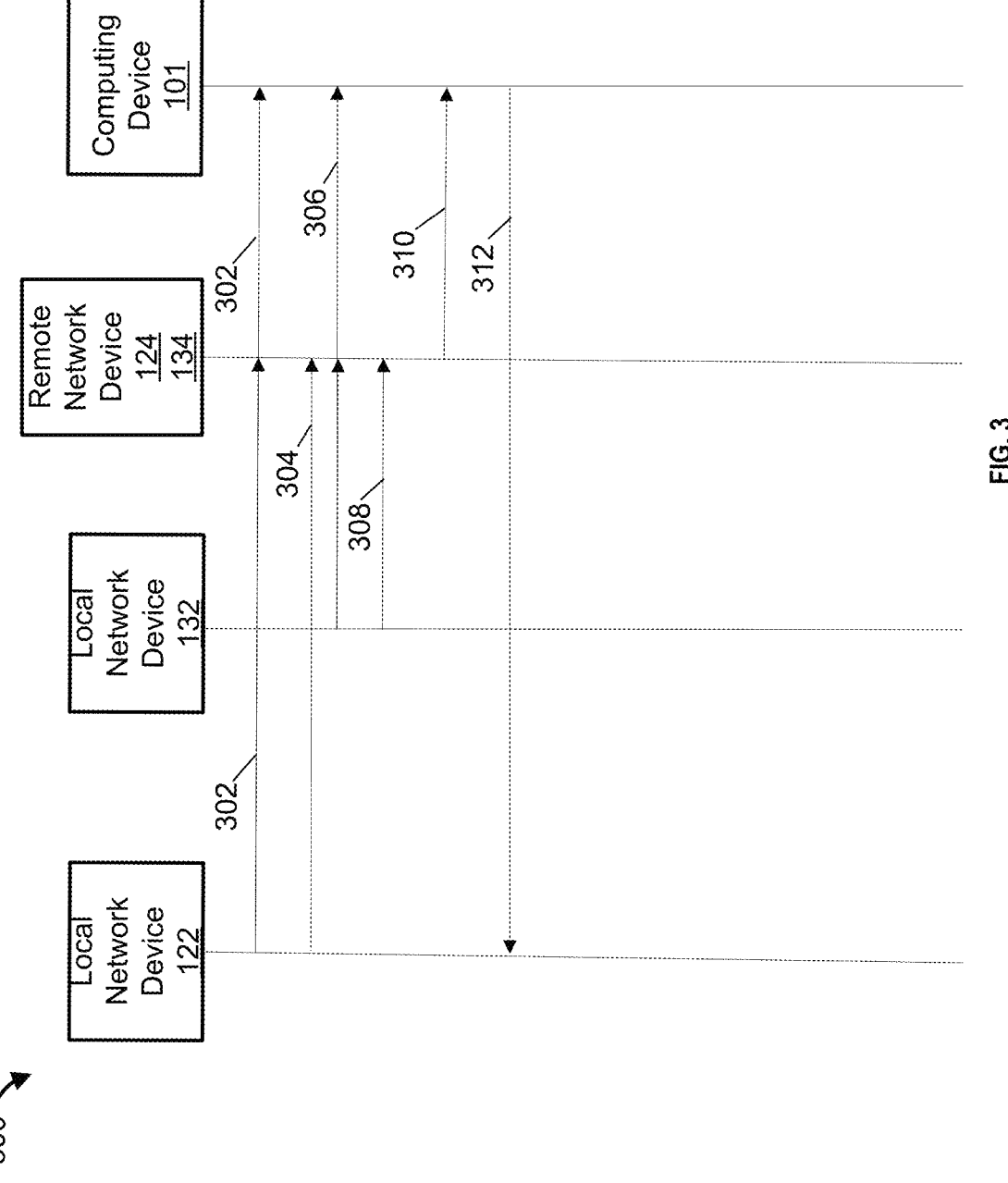
FIG. 3 shows an example communication diagram for identifying network identifiers.

FIG. 3 shows an example communication method 300 for identifying duplicate network identifiers or device identifiers (e.g., indicating duplicate network routes). The example communication method 300 may include one or more computing devices, such as one or more local network devices 122, 132; one or more remote network devices 124, 134; and/or a computing device 101. While certain actions are shown as being completed by certain devices within the example method 300, this is for example purposes only, as any of the devices described herein may complete any one or all of the elements described herein. Each of the computing devices 101, 122, 124, 132, 134 may be configured to send signals or messages comprising data to another one of the computing devices. The data may comprise one or more of messages, information, audio data, video data, audio-video data, content data, website data, and/or the like.

A signal or message 302 may be sent. The signal or message may be sent by the first local network device 122 associated with the first user device 120 at the first location. The first location may be a premises, such as a business premises, an office for a business, or a computing center for a business. In certain examples, the business may be one located at a residence. The first local network device 122 may be located at the first location. The signal or message 302 may be sent by the first local network device 122 to the computing device 101 via the network 110 or another network. For example, the signal or message 302 may be sent to the computing device 101 via the remote network device 124.

The first local network device 122 may be provisioned with one or more network addresses, such as one or more static IP addresses associated with the business at the first location. For example, the user device 120 may be hosting a web server associated with the first business at the first location and associated with one or more of the static IP addresses.

For example, the signal or message 302 may comprise one or more of one or more static IP addresses provisioned or associated with the first local network device 122, an authentication key associated with the first local network device 122, a MAC address identifying or associated with the first local network device 122, the block size for each static IP address provisioned or associated with the first local network device 122, and/or a time the first local network device

122 was configured. For example, the signal or message 302 may be a push notification from the first local network device 122. For example, the signal or message 302 may comprise a webpa push notification. For example, the signal or message 302 may be sent without the first local network device 122 receiving a corresponding request for the information in the signal or message 302. The signal or message 302 may be sent by the first local network device 122 when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed.

The computing device 101 may receive the signal or message 302. The computing device 101 may evaluate the signal or message 302 to identify the information within the signal or message 302 and record or store certain portions of the signal or message 302. For example, the computing device 101 may determine the static IP addresses associated with the first local network device 122 in the message 302 and may store an association of the static IP addresses to the first local network device 122 (e.g., the MAC address for the first local network device 122) in a database, such as the IP addresses 106 portion of the database 105 of the computing device 101. For example, the computing device 101 may determine the block sizes and/or configurations for the static IP addresses associated with the first local network device 122 in the message 302 and may store an association of the block sizes and/or configurations for the static IP addresses to the first local network device 122 (e.g., the MAC address for the first local network device 122) in a database, such as the block configurations 107 portion of the database 105 of the computing device 101. For example, the computing device 101 may determine the current authentication key and authentication time associated with the first local network device 122 in the message 302 and may store an association of the authentication key and authentication time to the first local network device 122 (e.g., the MAC address for the first local network device 122) in a database, such as the authentication keys 108 portion of the database 105 of the computing device 101.

A signal or message 304 may be sent. The signal or message may be sent by the first local network device 122 associated with the first user device 120 at the first location. The signal or message 304 may be sent by the first local network device 122 to the remote network device 124 via the network 110 or another network. For example, the remote network device 124 may comprise a CMTS, an OLT, or a DSLAM, etc. The remote network device 124 may be located remote from the first location.

For example, the signal or message 304 may comprise the one or more of one or more static IP addresses provisioned or associated with the first local network device 122, the authentication key associated with the first local network device 122, the device identifier (e.g., the MAC address) identifying or associated with the first local network device 122, the block size for each static IP address provisioned or associated with the first local network device 122, and/or a time the first local network device 122 was configured. For example, the signal or message 304 may be a push notification from the first local network device 122. For example, the signal or message 304 may comprise a RIPv2 update message. For example, the signal or message 304 may be sent without the first local network device 122 receiving a corresponding request for the information in the signal or message 304. For example, the signal or message 304 may be sent periodically without being requested by the computing device 101. For example, the signal or message 304 may be sent once every 30 seconds or any other time period desired.

The remote network device 124 may receive the signal or message 304. The remote network device 124 may evaluate the signal or message 304 to identify the information within the signal or message 304 and record or store certain portions of the signal or message 304. For example, the remote network device 124 may determine the static IP addresses associated with the first local network device 122 in the message 304 and may store an association of the static IP addresses to the first local network device 122 (e.g., the MAC address for the first local network device 122) in a routing table of the remote network device 124. The remote network device 124 may further evaluate the one or more static IP addresses associated with the first local network device 122 to determine if any other local network devices are associated with any one of the one or more static IP addresses identified in the signal or message 304. The remote network device 124 may compare each of the one or more static IP addresses in the message 304 to the static IP addresses in the routing table of the remote network device 124 to determine if any of the static IP addresses in the routing table match or are the same as the particular static IP address received in the signal or message 304.

A signal or message 306 may be sent. The signal or message 306 may be sent by the second local network device 132 associated with the second user device 130 at a second location different from the first location. The second location may be a premises, such as a business premises, an office for a business, or a computing center for a business. In certain examples, the business may be one located at a residence. The second local network device 132 may be located at the second location. The signal or message 306 may be sent by the second local network device 132 to the computing device 101 via the network 110 or another network. For example, the signal or message 306 may be sent to the computing device 101 via the remote network device 124 or the remote network device 134.

The second local network device 132 may be provisioned with one or more network addresses, such as one or more static IP addresses associated with the second business at the second location. For example, the user device 130 may be hosting a web server associated with the second business at the second location and associated with one or more of the static IP addresses. For example the static IP address directs Internet or Intranet traffic associated with one of the provisioned static IP addresses to the user device 130.

For example, the signal or message 306 may comprise the one or more static IP addresses (e.g., a second IP address) provisioned or associated with the second local network device 132. For example, the signal or message 306 may comprise, the one or more static IP addresses provisioned or associated with the second local network device 132, an authentication key associated with the second local network device 132, a device identifier (e.g., a MAC address) identifying or associated with the second local network device 132, the block size for each static IP address provisioned or associated with the second local network device 132, and/or a time the second local network device 132 was configured. For example, the signal or message 306 may be a push notification from the second local network device 132. For example, the signal or message 306 may comprise a webpa push notification. For example, the signal or message 306 may be sent without the second local network device 132 receiving a corresponding request for the information in the signal or message 306. The signal or message 306 may be sent by the second local network device 132 when one or more of the following occur: the second local network device 132 is provided with a new static IP address, the second local network device 132 is rebooted or restarted, the second local network device 132 is initially coupled to or recoupled to the network 110 or another network, or network configurations for the second local network device 132 are changed.

The computing device 101 may receive the signal or message 306. The computing device 101 may evaluate the signal or message 306 to identify the information within the signal or message 306 and record or store at least certain portions of the signal or message 306. For example, the computing device 101 may determine the static IP addresses associated with the second local network device 132 in the message 306 and may store an association of the static IP addresses to the second local network device 132 (e.g., the MAC address for the second local network device 132) in a database, such as the IP addresses 106 portion of the database 105 of the computing device 101. For example, the computing device 101 may determine the block sizes and/or configurations for the static IP addresses associated with the second local network device 132 in the message 306 and may store an association of the block sizes and/or configurations for the static IP addresses to the second local network device 132 (e.g., the MAC address for the second local network device 132) in a database, such as the block configurations 107 portion of the database 105 of the computing device 101. For example, the computing device 101 may determine the current authentication key and authentication time associated with the second local network device 132 in the message 306 and may store an association of the authentication key and authentication time to the second local network device 132 (e.g., the MAC address for the second local network device 132) in a database, such as the authentication keys 108 portion of the database 105 of the computing device 101.

The computing device 101 may determine or identify a duplication of a network address (e.g., a static IP address). For example, the computing device 101 may determine that a first static IP address provisioned at and associated with the first local network device 122 is the same as a second static IP address provisioned at and associated with the second local network device 132. For example, the computing device 101 may compare the one or more static IP addresses received in the signal or message 306 to the stored static IP addresses provisioned at and associated with other local network devices to determine if the one or more static IP addresses received in the signal or message 306 is the same as any one or more of the stored static IP addresses in, for example the IP addresses 106 portion of the database. For example, the computing device 101 may determine that the first static IP address associated with the first local network device 122 matches or is the same as the second static IP address associated with the second local network device 132.

The computing device 101 may determine which local network device 122, 132 should be associated with (e.g., is the correct current owner/user of) the first/second static IP address. For example, the computing device 101 may determine the device identifier (e.g., the MAC address) for each of the local network devices having the same static IP addresses. For example, the computing device 101 may determine or retrieve the device identifiers from the IP addresses 106 portion of the database 105 for each of the local network devices having the same static IP address.

For example, the billing system 103 of the computing device 101 may determine, based on the device identifier for the first local network device 122, account information associated with the first local network device 122. For example, the billing system 103 may determine, based on the device identifier for the second local network device 132, account information associated with the second local network device 132. For example, the account information may comprise an account number, a customer number, a customer name (e.g., a business name), a user ID, or the like.

The computing device 101 may determine the correct static IP addresses associated with each of the first local network device 122 and the second local network device 132. For example, the computing device 101, such as the IP management system 104, may determine the static IP addresses associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the static IP addresses associated with the first local network device 122. For example, the computing device 101, such as the IP management system 104, may determine the static IP addresses associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the static IP addresses associated with the second local network device 132.

The computing device 101 may determine if the current block size for the particular static IP address and/or the authentication key for the particular local network device 122, 132 are correct. For example, the computing device 101, such as the IP management system 104, may determine the correct block size for the particular static IP address and determine if the correct block size is different from the current block size for the particular static IP address associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the correct block size for the particular static IP address and determine if the correct block size is different from the current block size for the particular static IP address associated with the first local network device 122. For example, the computing device 101, such as the IP management system 104, may determine the correct block size for the particular static IP address and determine if the correct block size is different from the current block size for the particular static IP address associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the correct block size for the particular static IP address and determine if the correct block size is different from the current block size for the particular static IP address associated with the second local network device 132.

For example, the computing device 101, such as the IP management system 104, may determine the correct authentication key for the first local network device 122 and determine if the correct authentication key is different from the current authentication key for the first local network device 122 based on the account information associated with the first local network device 122. For example, the IP management system 104 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122. For example, the computing device 101, such as the IP management system 104, may determine the correct authentication key for the second local network device 132 and determine if the correct authentication key is different from the current authentication key for the second local network device 132 based on the account information associated with the second local network device 132. For example, the IP management system 104 may determine, based on one or more of the account number, customer number, customer name, or user ID associated with the second local network device 132, user device 130 and/or business at the second location, the correct authentication key for the second local network device 132 and determine if the correct authentication key is different from the current authentication key for the second local network device 132.

The computing device 101 may associate and store the correct static IP addresses, authentication key, and/or the correct block size for each of the provisioned static IP addresses for the first local network device 122 and the second local network device 132 with a device identifier of the particular first local network device 122 or second local network device 132. For example, the correct IP addresses, authentication key, and the correct block size may be stored in the database 105.

As an example, the computing device 101 may have determined that the first local network device 122 is incorrectly associated with the first/second static IP address and the second local network device 132 is correctly associated with the first/second static IP address. The computing device 101 may determine, based on the first local network device being incorrectly associated with or provisioned with the first/second static IP address, that a deprovisioning message 312 should be sent to the first local network device 122. For example, the computing device 101 may determine the deprovisioning message 312 should be sent to the first local network device 122 based on the indication that the second local network device 132 is correctly associated with the first/second static IP address and/or the first local network device 122 is incorrectly associated with the first/second static IP address. The computing device 101 may generate a deprovisioning message 312 to remove the first static IP address from the first local network device 122. The deprovisioning message 312 may include an indication for the first local network device 122 to remove the first static IP address from or disassociate the first static IP address from the first local network device 122. The computing device 101 may send the deprovisioning message 312 to the first local network device 122 via the network 110 or another network.

The first local network device 122 may receive the deprovisioning message 312. Based on receiving the deprovisioning message 312, the first local network device 122 may remove the first static IP address as an address associated with the first local network device 122. The deprovisioning 312 message may further include, or the computing device 101 may send a separate message comprising the correct block size for each correct static IP address associated with the first local network device 122 and/or the correct authentication key for the first local network device 122. The first local network device 122 may receive the message 312 or the additional message and update the block sizes and/or authentication key at the first local network device 122.

The computing device 101 may send another message to the second local network device 132. For example, the message may comprise the correct block size for each correct static IP address associated with the second local network device 132 and/or the correct authentication key for the second local network device 132. The second local network device 132 may receive the message and update the block sizes and/or authentication key at the second local network device 132.

A signal or message 308 may be sent. The signal or message may be sent by the second local network device 132 associated with the second user device 130 at the second location. The signal or message 308 may be sent by the second local network device 132 to the remote network device 124 or 134 via the network 110 or another network. For example, the remote network device 124 or 134 may comprise a CMTS. The remote network device 124 or 134 may be located remote from the second location.

For example, the signal or message 308 may comprise one or more of the one or more static IP addresses provisioned or associated with the second local network device 132, the authentication key associated with the second local network device 132, the device identifier (e.g., the MAC address) identifying or associated with the second local network device 132, the block size for each static IP address provisioned or associated with the second local network device 132, and/or a time the second local network device 132 was configured. For example, the signal or message 308 may be a push notification from the second local network device 132. For example, the signal or message 308 may comprise a RIPv2 update message. For example, the signal or message 308 may be sent without the second local network device 132 receiving a corresponding request for the information in the signal or message 308. For example, the signal or message 308 may be sent periodically without being requested by the computing device 101. For example, the signal or message 308 may be sent once every 30 seconds or any other time period desired.

The remote network device 124/134 may receive the signal or message 308. The remote network device 124/134 may evaluate the signal or message 308 to identify the information within the signal or message 308 and record or store certain portions of the signal or message 208. For example, the remote network device 124/134 may determine the static IP addresses associated with the second local network device 132 in the message 308 and may store an association of the static IP addresses to the second local network device 132 (e.g., the MAC address for the second local network device 132) in a routing table of the remote network device 124/134. The remote network device 124/134 may further evaluate the one or more static IP addresses associated with the second local network device 132 to determine if any other local network devices are associated with any one of the one or more static IP addresses identified in the signal or message 308. The remote network device 124/134 may compare each of the one or more static IP addresses in the message 308 to the static IP addresses in the routing table of the remote network device 124/134 to determine if any of the static IP addresses in the routing table match or are the same as the particular static IP address received in the signal or message 308.

In certain examples, the computing device 101 may not determine, based on the signal or message 306 from the second local network device 132, that there is a conflict with two or more local network devices being associated and/or provisioned with the same static IP address. For example, the remote network device 124/134 may determine the conflict with the first static IP address associated with the first local network device 122 and the second static IP address associated with the second local network device 132 based on receiving the signal or message 308. For example, based on the comparison of each of the one or more static IP addresses in the message 308 to the static IP addresses in the routing table of the remote network device 124/134 the remote network device 124/134 may determine that the first static IP address associated with the first local network device 122 is the same as the second static IP address associated with the second local network device 132. Based on the determination of a conflict of the first static IP address associated with the first local network device 122 and the second static IP address associated with the second local network device 132, the remote network device 124/134 may send a signal or message 310 to the computing device 101. The signal or message 310 may indicate the conflict of the first static IP address associated with the first local network device 122 and the second static IP address associated with the second local network device 132. For example, the signal or message 310 may comprise the device identifier for the first local network device 122, the device identifier for the second local network device 132, and the first/second static IP address (e.g., since they are one and the same). For example, the signal or message 310 may also comprise the block size for each static IP address associated with the first local network device 122, the block size for each static IP address associated with the second local network device 132, the authentication key associated with the first local network device 122, and/or the authentication key associated with the second local network device 132. The computing device 101 may receive the signal or message 310 and may take actions similar to those discussed above upon receiving the signal or message 306 to evaluate and correct 312 the conflict of the static IP addresses.

Figure 4:
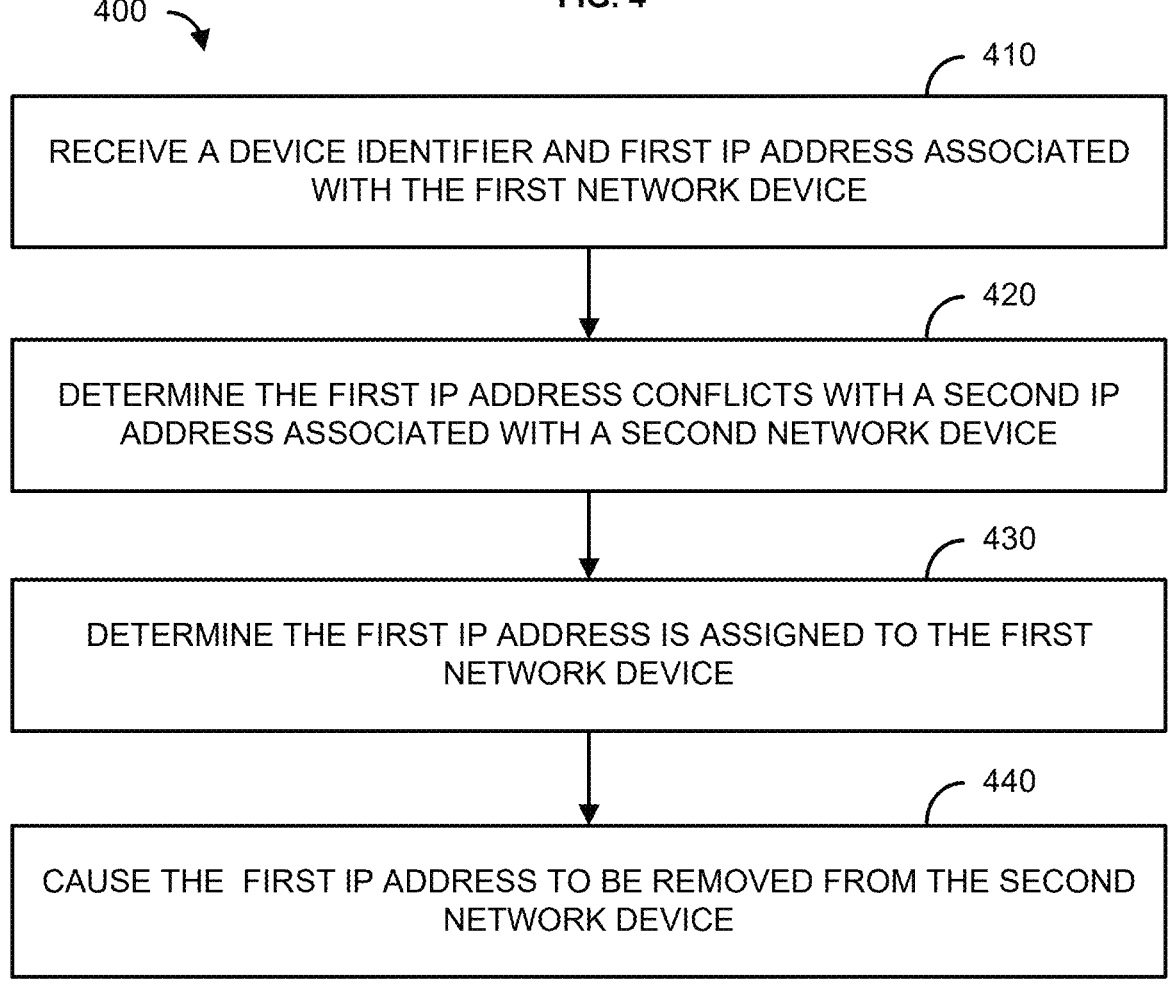
FIG. 4 shows a flowchart of an example method.

FIG. 4 shows a flowchart of an example method 400 for determining and correcting duplicate network identifiers or device identifiers (e.g., indicating duplicate network routes). For example, the duplicate network identifiers or device identifiers may be determined and corrected by a computing device (e.g., the computing device 101, or the computing device 114). The computing device 101 may receive a second signal or message. For example, the second signal or message may be received from the second local network device 132 via the network 110 or another network. The second local network device 132 may be associated with a second business at a second location. The second local network device 132 may be located at the second location. For example, the second signal or message may be received by the computing device 101 from the second local network device 132 via the remote network device 124 or the remote network device 134. For example, the second signal or message may comprise a push notification, such as a webpa push notification.

The second signal or message may comprise the one or more static IP addresses (e.g., a second static IP address) provisioned or associated with the second local network device 132, an authentication key associated with the second local network device 132, a device identifier (e.g., a MAC address) identifying or associated with the second local network device 132, the block size for each static IP address provisioned or associated with the second local network device 132, and/or a time the second local network device 132 was configured. The second signal or message 306 may be received by the computing device 101 when one or more of the following occur: the second local network device 132 is provided with a new static IP address, the second local network device 132 is rebooted or restarted, the second local network device 132 is initially coupled to or recoupled to the network 110 or another network, or network configurations for the second local network device 132 are changed.

The computing device 101 may evaluate the second signal or message to identify the information within the second signal or message and record or store at least certain portions of the second signal or message. For example, the computing device 101 may determine the static IP addresses associated with the second local network device 132 in the second message and may store an association of the static IP addresses to the second local network device 132 (e.g., the MAC address for the second local network device 132) in a database, such as the IP addresses 106 portion of the database 105 of the computing device 101. For example, the computing device 101 may determine the block sizes and/or configurations for the static IP addresses associated with the second local network device 132 in the second message and may store an association of the block sizes and/or configurations for the static IP addresses to the second local network device 132 (e.g., the MAC address for the second local network device 132) in a database, such as the block configurations 107 portion of the database 105 of the computing device 101. For example, the computing device 101 may determine the current authentication key and authentication time associated with the second local network device 132 in the second message and may store an association of the authentication key and authentication time to the second local network device 132 (e.g., the MAC address for the second local network device 132) in a database, such as the authentication keys 108 portion of the database 105 of the computing device 101.

At 410, a device identifier and a first IP address associated with the first local network device 122 may be received. For example, the device identifier and the first IP address may be received by the computing device 101 or any other computing device described herein. For example, the device identifier and the first IP address may be received from the first local network device 122 via the network 110 or another network. For example, the device identifier and the first IP address may be received from the first local network device 122 via the remote network device 124. The device identifier may comprise a MAC address for the first local network device. The first IP address may comprise a first static IP address associated with and/or provisioned to the first local network device 122.

The first local network device 122 may be associated with a first business at a first location different from the second business. The first IP address (e.g., the first static IP address) may be associated with the first business. The device identifier and the first IP address may be received as part of a first signal or message sent by the first local network device 122 and received by the computing device 101. For example, the first signal or message may comprise one or more first IP addresses (e.g., one or more first static IP addresses) provisioned or associated with the first local network device 122, an authentication key associated with the first local network device 122, the device identifier identifying or associated with the first local network device 122, the block size for each IP address provisioned or associated with the first local network device 122, and/or a time the first local network device 122 was configured. For example, the first signal or message may be a push notification received by the computing device 101. For example, the first signal or message may comprise a webpa push notification. The first signal or message may be received by the computing device 101 when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed.

The computing device 101 may evaluate the first signal or message to identify or determine the information within the first signal or message and record or store certain portions of the first signal or message. For example, the computing device 101 may determine the first IP address (e.g., the first static IP address) associated with the first local network device 122 in the first message and may store an association of the first IP address to the first local network device 122 (e.g., the device identifier, such as the MAC address, for the first local network device 122) in a database, such as the IP addresses 106 portion of the database 105 of the computing device 101. For example, the computing device 101 may determine the block size and/or configuration for the first IP address associated with the first local network device 122 in the first message and may store an association of the block size and/or configuration for the first IP address to the first local network device 122 (e.g., the device identifier, such as the MAC address, for the first local network device 122) in a database, such as the block configurations 107 portion of the database 105 of the computing device 101. For example, the computing device 101 may determine the current authentication key and authentication time associated with the first local network device 122 in the first message and may store an association of the authentication key and authentication time to the first local network device 122 (e.g., the device identifier, such as the MAC address, for the first local network device 122) in a database, such as the authentication keys 108 portion of the database 105 of the computing device 101.

At 420, a determination may be made that the first IP address associated with the first local network device 122 conflicts with or is a duplicate of a second IP address associated with the second local network device 132. For example, the determination may be made by the computing device 101 on any other computing device described herein. For example, the determination may be made based on the computing device 101 receiving one or more of the first message comprising the first IP address (e.g., the first static IP address) or the second message comprising the second IP address (e.g., the second static IP address). For example, the determination may be based on the first IP address associated with the first local network device 122.

For example, the computing device 101 may determine that the first IP address provisioned at and associated with the first local network device 122 is the same as the second IP address provisioned at and associated with the second local network device 132. For example, the computing device 101 may compare the first IP address received in the first signal or message to the stored IP addresses (e.g., stored static IP addresses which includes the second IP address previously received and stored by the computing device 101) provisioned at and associated with other local network devices to determine if the first IP address is the same as, and thus conflicts with, any one or more of the stored IP addresses in, for example the IP addresses 106 portion of the database 105. For example, the computing device 101 may determine that the first IP address associated with the first local network device 122 matches or is the same as (and thus conflicts with) the second IP address associated with the second local network device 132.

At 430, the first IP address may be determined to be correctly assigned to the first local network device 122. For example, the determination may be made by the computing device 101 or any other computing device described herein. For example, the determination may be based on the device identifier (e.g., the MAC address) identifying and/or associated with the first local network device 122. For example, the computing device 101 may determine which local network device 122, 132 should be associated with (e.g., is the correct current owner/user of) the first/second IP address. For example, the computing device 101 may determine, either based on the first signal or message or based on the stored first IP address in the database 105, the device identifier (e.g., the MAC address) for the first local network device 122. For example, the computing device 101 may determine, either based on the first signal or message, the second signal or message, and/or the stored first IP address and second IP address in the database 105, the device identifier (e.g., the MAC address) for each of the local network devices having the same IP addresses (e.g., the first IP address and the second IP address). For example, the computing device 101 may determine or retrieve the device identifiers for the first local network device 122 and the second local network device 132 from the IP addresses 106 portion of the database 105.

For example, the computing device 101, such as the billing system 103, may determine, based on the device identifier for the first local network device 122, account information associated with the first local network device 122. For example, the computing device 101, such as the billing system 103, may determine, based on the device identifier for the second local network device 132, account information associated with the second local network device 132. For example, the account information may comprise an account number, a customer number, a customer name (e.g., a business name), a user ID, or the like.

The computing device 101 may determine the correct IP addresses (e.g., correct static IP addresses) associated with each of the first local network device 122 and the second local network device 132. For example, the computing device 101, such as the IP management system 104, may determine the IP addresses associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the IP addresses associated with the first local network device 122. For example, the IP management system 104 may determine that the first IP address (e.g., the first static IP address) is among the IP addresses correctly associated with the first local network device 122 and is thus, assigned to the first local network device 122. For example, the determination may be made based on the first IP address being in a database or table of IP address associated with or provisioned on the first local network device 122.

For example, the computing device 101, such as the IP management system 104, may determine the IP addresses associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the IP addresses associated with the second local network device 132. For example, the IP management system 104 may determine that the second IP address (e.g., the second static IP address) which is the same as the first IP address, should not be associated with or provisioned on the second local network device 132. For example, the determination may be made based on the second IP address not being in a database or table of IP address associated with or provisioned on the second local network device 132.

The computing device 101 may further determine if the current block size for the particular IP address and/or the authentication key for the particular local network device 122, 132 are correct. For example, the computing device 101, such as the IP management system 104, may determine the correct block size for the particular IP address (e.g., one or more of the static IP addresses correctly provisioned on the first local network device 122) and determine if the correct block size is different from the current block size for the particular IP address associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the correct block size for the particular IP address and determine if the correct block size is different from the current block size for the particular IP address associated with the first local network device 122.

For example, the computing device 101, such as the IP management system 104, may determine the correct block size for the particular IP address (e.g., one or more of the static IP addresses correctly provisioned on the second network device 132) and determine if the correct block size is different from the current block size for the particular IP address associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the correct block size for the particular IP address and determine if the correct block size is different from the current block size for the particular IP address associated with the second local network device 132.

For example, the computing device 101, such as the IP management system 104, may determine the correct authentication key for the first local network device 122 and determine if the correct authentication key is different from the current authentication key for the first local network device 122 based on the account information associated with the first local network device 122. For example, the IP management system 104 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122. For example, the computing device 101, such as the IP management system 104, may determine the correct authentication key for the second local network device 132 and determine if the correct authentication key is different from the current authentication key for the second local network device 132 based on the account information associated with the second local network device 132. For example, the IP management system 104 may determine, based on one or more of the account number, customer number, customer name, or user ID associated with the second local network device 132, user device 130 and/or business at the second location, the correct authentication key for the second local network device 132 and determine if the correct authentication key is different from the current authentication key for the second local network device 132.

The computing device 101 may associate and store the correct IP addresses, authentication key, and/or the correct block size for each of the provisioned IP addresses for the first local network device 122 and the second local network device 132 with a device identifier of the particular first local network device 122 or second local network device 132. For example, the correct IP addresses, authentication key, and the correct block size may be stored in the database 105.

At 440, the first IP address may be caused to be removed from or deprovisioned from the second local network device 132. For example, the first IP address (e.g., the first static IP address) may be the same as the second IP address (e.g., the second static IP address). For example, the computing device 101 may cause the first IP address to be removed or deprovisioned from the second local network device 132. The first IP address may be caused to be removed or deprovisioned from the second local network device 132 based on the first IP address being assigned to or correctly provisioned on the first local network device 122. For example, the computing device 101 may determine, based on the first IP address being assigned to or correctly provisioned on the first local network device 122 and/or based on determining the first/second IP address should not be associated with or provisioned on the second local network device 132, that a deprovisioning message should be sent to the second local network device 132. The computing device 101 may generate a deprovisioning message to remove or deprovision the first IP address (e.g., the second IP address) from the second local network device 132. The deprovisioning message may include an indication for the second local network device 132 to remove or deprovision the first IP address from or disassociate the first IP address from the second local network device 132. The computing device 101 may send the deprovisioning message to the second local network device 132 via the network 110 or another network to cause the first IP address to be removed from the second network device 132.

The second network device 132 may receive the deprovisioning message from the computing device 101. The second network device 132 may, based on the deprovisioning message, remove or deprovision the first IP address (e.g., the second IP address) from the second network device 132.

The deprovisioning message may further include, or the computing device 101 may send a separate message comprising the correct block size for each correct IP address associated with the second local network device 132 and/or the correct authentication key for the second local network device 132. The second local network device 132 may receive the deprovisioning message or the additional message and update the block sizes and/or authentication key at the second local network device 132.

For example, when the first IP address associated with or provisioned on the network device is removed from the network device, a new, correct IP address to associate or provision on the network device may be identified. For example, the new, correct IP address to be associated or provisioned on the network device may be identified from and/or by the IP management system 104, 118. The network device (e.g., the second local network device 132) may be associated with or provisioned with the new, correct IP address. For example, the computing device 101 or the remote network device 134 may send a provisioning signal, message, or indication to network device that comprises or indicates the new, correct IP address for the network device. Subsequent to the network device being associated with or provisioned with the new, correct IP address (e.g., the correct static IP address or addresses for the network device), the network device may send a subsequent signal or message to the remote network device 134. The subsequent message or signal may comprise the one or more of new, correct static IP addresses provisioned or associated with the network device (e.g., the second local network device 132), the authentication key associated with the network device, the device identifier (e.g., the MAC address) identifying or associated with the network device, the block size for each new, correct static IP address provisioned or associated with the network device, and/or a time the network device was configured. For example, the subsequent signal or message may be a push notification from the network device, such as a RIPv2 update message. The remote network device 134 may receive the subsequent signal or message and update the routing table to indicate that the network device (e.g., the first local network device) is associated with or provisioned with the new, correct static IP addresses indicated in the subsequent signal or message.

For example, when the first IP address associated with or provisioned on the network device is removed from the network device, it may be determined that there is no current IP address (e.g., static IP address) to associate with or provision to the network device (e.g., the second local network device 132). For example, when the first IP address is removed from the network device, certain configuration settings and/or memory may also be removed from the network device. Removal of these configuration settings and/or memory may prevent or stop the network device from sending a subsequent signal or message (e.g., a RIPv2 update message) to the remote network device 134. The remote network device 134 may be configured to remove a network device, such as the second local network device 132 from the routing table for the remote network device 134 if an update is not received from the network device for an amount of time. For example, the amount of time may be a predetermined and/or threshold amount of time. For example, the amount of time may be any amount of time within the range of 1 second to 600 seconds, and preferable about 300 seconds.

The computing device 101 may send another message to the first local network device 122. For example, the message may comprise the correct block size for each correct IP address associated with the first local network device 122 and/or the correct authentication key for the first local network device 122. The first local network device 122 may receive the message and update the block sizes and/or authentication key at the first local network device 122.

Figure 5:
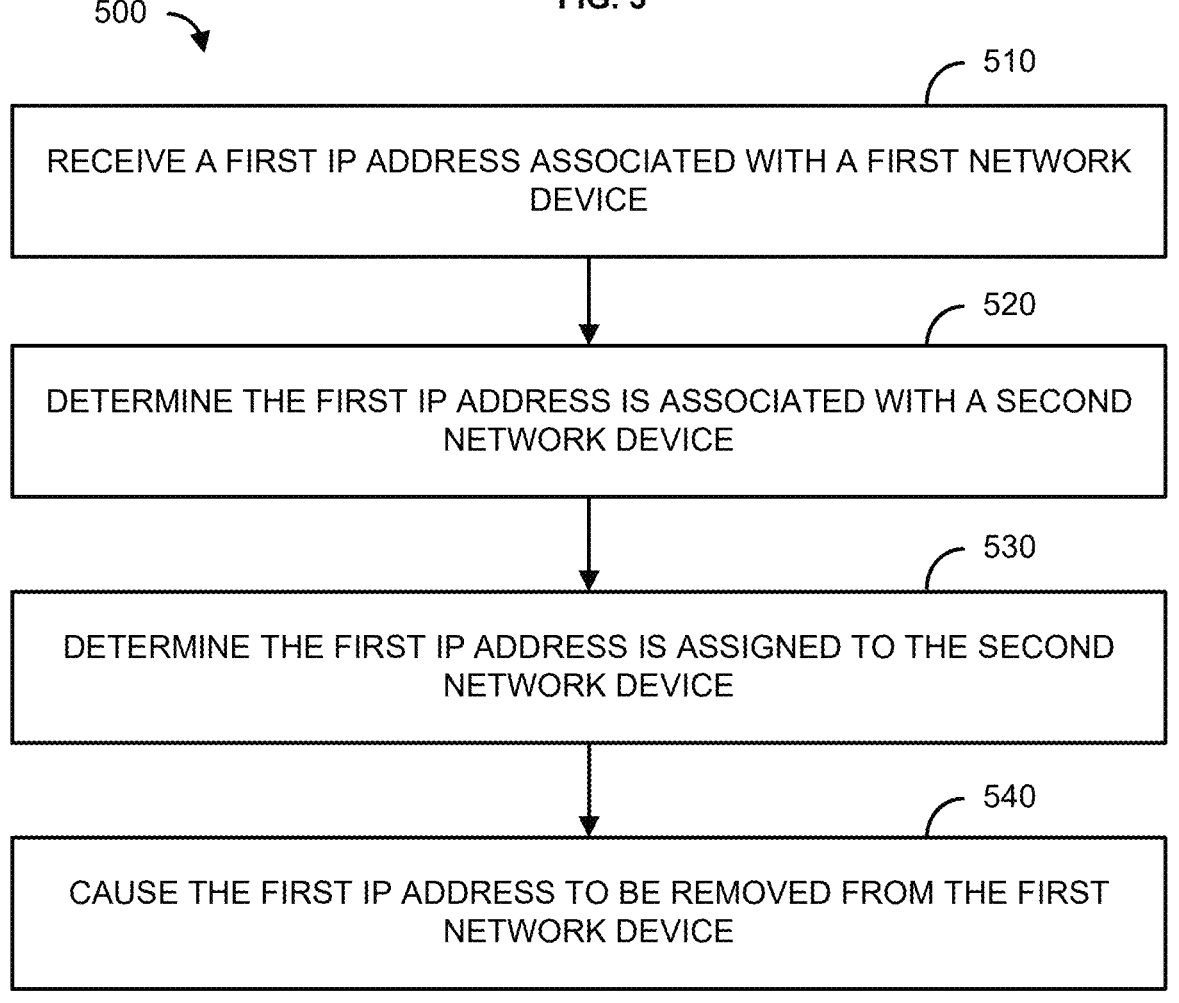
FIG. 5 shows a flowchart of an example method.

FIG. 5 shows a flowchart of an example method 500 for determining and correcting duplicate network identifiers or device identifiers (e.g., indicating duplicate network routes). For example, the duplicate network identifiers or device identifiers may be determined and corrected by a computing device (e.g., the computing device 101, or the computing device 114). The computing device 101 may receive a second signal or message. For example, the second signal or message may be received from the second local network device 132 via the network 110 or another network. The second local network device 132 may be associated with a second business at a second location. The second local network device 132 may be located at the second location. For example, the second signal or message may be received by the computing device 101 from the second local network device 132 via the remote network device 124 or the remote network device 134. For example, the second signal or message may comprise a push notification, such as a webpa push notification.

The second signal or message may comprise a first IP address (e.g., a first static IP address) provisioned or associated with the second local network device 132, an authentication key associated with the second local network device 132, a device identifier (e.g., a MAC address) identifying or associated with the second local network device 132, the block size for the first IP address provisioned or associated with the second local network device 132, and/or a time the second local network device 132 was configured. The second signal or message 306 may be received by the computing device 101 when one or more of the following occur: the second local network device 132 is provided with a new IP address (e.g., a new static IP address), the second local network device 132 is rebooted or restarted, the second local network device 132 is initially coupled to or recoupled to the network 110 or another network, or network configurations for the second local network device 132 are changed.

The computing device 101 may evaluate the second signal or message to identify the information within the second signal or message and record or store at least certain portions of the second signal or message. For example, the computing device 101 may determine the IP addresses (e.g., the first IP address) associated with the second local network device 132 in the second message and may store an association of the first IP addresses to the second local network device 132 (e.g., the MAC address for the second local network device 132) in a database, such as the IP addresses 106 portion of the database 105 of the computing device 101. For example, the computing device 101 may determine the block sizes and/or configurations for the first IP address and any other IP addresses associated with the second local network device 132 in the second message and may store an association of the block sizes and/or configurations for the IP addresses to the second local network device 132 (e.g., the MAC address for the second local network device 132) in a database, such as the block configurations 107 portion of the database 105 of the computing device 101. For example, the computing device 101 may determine the current authentication key and authentication time associated with the second local network device 132 in the second message and may store an association of the authentication key and authentication time to the second local network device 132 (e.g., the MAC address for the second local network device 132) in a database, such as the authentication keys 108 portion of the database 105 of the computing device 101.

At 510, a first IP address associated with the first local network device 122 may be received. For example, the first IP address may be received by the computing device 101 or any other computing device described herein. For example, the first IP address may be received from the first local network device 122 via the network 110 or another network. For example, the first IP address may be received from the first local network device 122 via the remote network device 124. The first IP address may comprise a first static IP address associated with and/or provisioned to the first local network device 122.

The first local network device 122 may be associated with a first business at a first location different from the second business. The first IP address (e.g., the first static IP address) may be associated with the first business. The first IP address may be received as part of a first signal or message sent by the first local network device 122 and received by the computing device 101. For example, the first signal or message may comprise one or more IP addresses (e.g., one or more static IP addresses) provisioned or associated with the first local network device 122 including the first IP address, a device identifier (e.g., a MAC address) identifying or associated with the first local network device 122, an authentication key associated with the first local network device 122, the block size for each IP address provisioned or associated with the first local network device 122, and/or a time the first local network device 122 was configured. For example, the first signal or message may be a push notification received by the computing device 101. For example, the first signal or message may comprise a webpa push notification. The first signal or message may be received by the computing device 101 when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed.

The computing device 101 may evaluate the first signal or message to identify or determine the information within the first signal or message and record or store certain portions of the first signal or message. For example, the computing device 101 may determine the first IP address (e.g., the first static IP address) associated with the first local network device 122 in the first message and may store an association of the first IP address to the first local network device 122 (e.g., the device identifier, such as the MAC address, for the first local network device 122) in a database, such as the IP addresses 106 portion of the database 105 of the computing device 101. For example, the computing device 101 may determine the block size and/or configuration for the first IP address associated with the first local network device 122 in the first message and may store an association of the block size and/or configuration for the first IP address to the first local network device 122 (e.g., the device identifier, such as the MAC address, for the first local network device 122) in a database, such as the block configurations 107 portion of the database 105 of the computing device 101. For example, the computing device 101 may determine the current authentication key and authentication time associated with the first local network device 122 in the first message and may store an association of the authentication key and authentication time to the first local network device 122 (e.g., the device identifier, such as the MAC address, for the first local network device 122) in a database, such as the authentication keys 108 portion of the database 105 of the computing device 101.

At 520, a determination may be made that the first IP address is associated with the second local network device 132. For example, the determination may be made by the computing device 101 on any other computing device described herein. For example, the determination may be made based on the computing device 101 receiving one or more of the first message comprising the first IP address (e.g., the first static IP address) or the second message comprising the first IP address.

For example, the computing device 101 may determine that the first IP address provisioned at and associated with the first local network device 122 is the same as the first IP address provisioned at and associated with the second local network device 132. For example, the computing device 101 may compare the first IP address received in the first signal or message to the stored IP addresses (e.g., stored static IP addresses which includes the first IP address previously received and stored by the computing device 101 for the second local network device 132) provisioned at and associated with other local network devices to determine if the first IP address is the same as any one or more of the stored IP addresses in, for example the IP addresses 106 portion of the database 105. For example, the computing device 101 may determine that the first IP address associated with the first local network device 122 matches or is the same as the first IP address associated with the second local network device 132.

At 530, the first IP address may be determined to be correctly assigned to the second local network device 132. For example, the determination may be made by the computing device 101 or any other computing device described herein. For example, the determination may be based on the device identifier (e.g., the MAC address) identifying and/or associated with the second local network device 132. For example, the computing device 101 may determine which local network device 122, 132 should be associated with (e.g., is the correct current owner/user of) the first IP address. For example, the computing device 101 may determine, either based on the second signal or message or based on the stored first IP address in the database 105, the device identifier (e.g., the MAC address) for the second local network device 132. For example, the computing device 101 may determine, either based on the first signal or message, the second signal or message, and/or the stored first IP address in the database 105, the device identifier (e.g., the MAC address) for each of the local network devices having the same first IP address. For example, the computing device 101 may determine or retrieve the device identifiers for the first local network device 122 and the second local network device 132 from the IP addresses 106 portion of the database 105.

For example, the computing device 101, such as the billing system 103, may determine, based on the device identifier for the first local network device 122, account information associated with the first local network device 122. For example, the computing device 101, such as the billing system 103, may determine, based on the device identifier for the second local network device 132, account information associated with the second local network device 132. For example, the account information may comprise an account number, a customer number, a customer name (e.g., a business name), a user ID, or the like.

The computing device 101 may determine the correct IP addresses (e.g., correct static IP addresses) associated with each of the first local network device 122 and the second local network device 132. For example, the computing device 101, such as the IP management system 104, may determine the IP addresses associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the IP addresses associated with the first local network device 122. For example, the IP management system 104 may determine that the first IP address (e.g., the first static IP address) should not be associated with or provisioned on the first local network device 122. For example, the determination may be made based on the first IP address not being in a database or table of IP address associated with or provisioned on the first local network device 122.

For example, the computing device 101, such as the IP management system 104, may determine the IP addresses associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the IP addresses associated with the second local network device 132. For example, the IP management system 104 may determine that the first IP address (e.g., the first static IP address) is among the IP addresses correctly associated with the second local network device 132 and is thus, assigned to the second local network device 132. For example, the determination may be made based on the first IP address being in a database or table of IP address associated with or provisioned on the second local network device 132.

The computing device 101 may further determine if the current block size for the particular IP address and/or the authentication key for the particular local network device 122, 132 are correct. For example, the computing device 101, such as the IP management system 104, may determine the correct block size for the particular IP address (e.g., one or more of the static IP addresses correctly provisioned on the first local network device 122) and determine if the correct block size is different from the current block size for the particular IP address associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the correct block size for the particular IP address and determine if the correct block size is different from the current block size for the particular IP address associated with the first local network device 122.

For example, the computing device 101, such as the IP management system 104, may determine the correct block size for the particular IP address (e.g., one or more of the static IP addresses correctly provisioned on the second network device 132) and determine if the correct block size is different from the current block size for the particular IP address associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the correct block size for the particular IP address and determine if the correct block size is different from the current block size for the particular IP address associated with the second local network device 132.

For example, the computing device 101, such as the IP management system 104, may determine the correct authentication key for the first local network device 122 and determine if the correct authentication key is different from the current authentication key for the first local network device 122 based on the account information associated with the first local network device 122. For example, the IP management system 104 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122. For example, the computing device 101, such as the IP management system 104, may determine the correct authentication key for the second local network device 132 and determine if the correct authentication key is different from the current authentication key for the second local network device 132 based on the account information associated with the second local network device 132. For example, the IP management system 104 may determine, based on one or more of the account number, customer number, customer name, or user ID associated with the second local network device 132, user device 130 and/or business at the second location, the correct authentication key for the second local network device 132 and determine if the correct authentication key is different from the current authentication key for the second local network device 132.

The computing device 101 may associate and store the correct IP addresses, authentication key, and/or the correct block size for each of the provisioned IP addresses for the first local network device 122 and the second local network device 132 with a device identifier of the particular first local network device 122 or second local network device 132. For example, the correct IP addresses, authentication key, and the correct block size may be stored in the database 105.

At 540, the first IP address may be caused to be removed from or deprovisioned from the first local network device 122. For example, the computing device 101 may cause the first IP address to be removed or deprovisioned from the first local network device 122. The first IP address may be caused to be removed or deprovisioned from the first local network device 122 based on the first IP address being assigned to or correctly provisioned on the second local network device 132. For example, the computing device 101 may determine, based on the first IP address being assigned to or correctly provisioned on the second local network device 132 and/or based on determining the first IP address should not be associated with or provisioned on the first local network device 122, that a deprovisioning message should be sent to the first local network device 122. The computing device 101 may generate a deprovisioning message to remove or deprovision the first IP address (e.g., the first static IP address) from the first local network device 122. The deprovisioning message may include an indication for the first local network device 122 to remove or deprovision the first IP address from or disassociate the first IP address from the first local network device 122. The computing device 101 may send the deprovisioning message to the first local network device 122 via the network 110 or another network to cause the first IP address to be removed from the first local network device 122.

The first local network device 122 may receive the deprovisioning message from the computing device 101. The first local network device 122 may, based on the deprovisioning message, remove or deprovision the first IP address (e.g., the first static IP address) from the first local network device 122.

The deprovisioning message may further include, or the computing device 101 may send a separate message comprising the correct block size for each correct IP address associated with the first local network device 122 and/or the correct authentication key for the first local network device 122. The first local network device 122 may receive the deprovisioning message or the additional message and update the block sizes and/or authentication key at the first local network device 122.

For example, when the first IP address associated with or provisioned on the network device is removed from the network device, a new, correct IP address to associate or provision on the network device may be identified. For example, the new, correct IP address to be associated or provisioned on the network device may be identified from and/or by the IP management system 104, 118. The network device (e.g., the first local network device 122) may be associated with or provisioned with the new, correct IP address. For example, the computing device 101 or the remote network device 124 may send a provisioning signal, message, or indication to network device that comprises or indicates the new, correct IP address for the network device. Subsequent to the network device being associated with or provisioned with the new, correct IP address (e.g., the correct static IP address or addresses for the network device), the network device may send a subsequent signal or message to the remote network device 124. The subsequent message or signal may comprise the one or more of new, correct static IP addresses provisioned or associated with the network device (e.g., the first local network device 122), the authentication key associated with the network device, the device identifier (e.g., the MAC address) identifying or associated with the network device, the block size for each new, correct static IP address provisioned or associated with the network device, and/or a time the network device was configured. For example, the subsequent signal or message may be a push notification from the network device, such as a RIPv2 update message. The remote network device 124 may receive the subsequent signal or message and update the routing table to indicate that the network device (e.g., the first local network device) is associated with or provisioned with the new, correct static IP addresses indicated in the subsequent signal or message.

For example, when the first IP address associated with or provisioned on the network device is removed from the network device, it may be determined that there is no current IP address (e.g., static IP address) to associate with or provision to the network device (e.g., the first local network device 122). For example, when the first IP address is removed from the network device, certain configuration settings and/or memory may also be removed from the network device. Removal of these configuration settings and/or memory may prevent or stop the network device from sending a subsequent signal or message (e.g., a RIPv2 update message) to the remote network device 124. The remote network device 124 may be configured to remove a network device, such as the first local network device 122 from the routing table for the remote network device 124 if an update is not received from the network device for an amount of time. For example, the amount of time may be a predetermined and/or threshold amount of time. For example, the amount of time may be any amount of time within the range of 1 second to 600 seconds, and preferable about 300 seconds.

The computing device 101 may send another message to the second local network device 132. For example, the message may comprise the correct block size for each correct IP address associated with the second local network device 132 and/or the correct authentication key for the second local network device 132. The second local network device 132 may receive the message and update the block sizes and/or authentication key at the second local network device 132.

FIG. 6 shows a flowchart of an example method 600 for determining and correcting duplicate network identifiers or device identifiers (e.g., indicating duplicate network routes). For example, the duplicate network identifiers or device identifiers may be determined and corrected by a computing device (e.g., the computing device 101, or the computing device 114). At 610, a first device identifier and a first IP address associated with the first local network device 122 may be received. For example, the first device identifier and the first IP address may be received by the computing device 101 or any other computing device described herein. For example, the first device identifier and the first IP address may be received from the first local network device 122 via the network 110 or another network. For example, the device identifier and the first IP address may be received from the first local network device 122 via the remote network device 124. The first device identifier may comprise a MAC address for the first local network device. The first IP address may comprise a first static IP address associated with and/or provisioned to the first local network device 122.

The first local network device 122 may be associated with a first business at a first location. The first IP address (e.g., the first static IP address) may be associated with the first business. The first device identifier and the first IP address may be received as part of a first signal or message sent by the first local network device 122 and received by the computing device 101. For example, the first signal or message may comprise one or more IP addresses (e.g., one or more static IP addresses), including the first IP address, provisioned or associated with the first local network device 122, an authentication key associated with the first local network device 122, the first device identifier identifying or associated with the first local network device 122, the block size for each IP address provisioned or associated with the first local network device 122, and/or a time the first local network device 122 was configured. For example, the first signal or message may be a push notification received by the computing device 101. For example, the first signal or message may comprise a webpa push notification. The first signal or message may be received by the computing device 101 when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed.

The computing device 101 may evaluate the first signal or message to identify or determine the information within the first signal or message and record or store certain portions of the first signal or message. For example, the computing device 101 may determine the first IP address (e.g., the first static IP address) associated with the first local network device 122 in the first message and may store an association of the first IP address to the first local network device 122 (e.g., the first device identifier, such as the MAC address, for the first local network device 122) in a database, such as the IP addresses 106 portion of the database 105 of the computing device 101. For example, the computing device 101 may determine the block size and/or configuration for the first IP address associated with the first local network device 122 in the first message and may store an association of the block size and/or configuration for the first IP address to the first local network device 122 (e.g., the first device identifier, such as the MAC address, for the first local network device 122) in a database, such as the block configurations 107 portion of the database 105 of the computing device 101. For example, the computing device 101 may determine the current authentication key and authentication time associated with the first local network device 122 in the first message and may store an association of the authentication key and authentication time to the first local network device 122 (e.g., the first device identifier, such as the MAC address, for the first local network device 122) in a database, such as the authentication keys 108 portion of the database 105 of the computing device 101.

At 620, a second device identifier and the first IP address associated with the second local network device 132 may be received. For example, the second device identifier and the first IP address may be received by the computing device 101 or any other computing device described herein. For example, the second device identifier and the first IP address may be received from the second local network device 132 via the network 110 or another network. For example, the second device identifier and the first IP address may be received from the second local network device 132 via the remote network device 134. The second device identifier may comprise a MAC address for the second local network device 132. The first IP address may comprise a first static IP address associated with and/or provisioned to the second local network device 132.

The second local network device 132 may be associated with a second business at a second location different from the first business. The first IP address (e.g., the first static IP address) may be associated with the second business. The second device identifier and the first IP address may be received as part of a second signal or message sent by the second local network device 132 and received by the computing device 101. For example, the second signal or message may comprise one or more IP addresses (e.g., one or more static IP addresses), including the first IP address, provisioned or associated with the second local network device 132, an authentication key associated with the second local network device 132, the second device identifier identifying or associated with the first local network device 132, the block size for each IP address provisioned or associated with the second local network device 132, and/or a time the second local network device 132 was configured. For example, the second signal or message may be a push notification received by the computing device 101. For example, the second signal or message may comprise a webpa push notification. The second signal or message may be received by the computing device 101 when one or more of the following occur: the second local network device 132 is provided with a new static IP address, the second local network device 132 is rebooted or restarted, the second local network device 132 is initially coupled to or recoupled to the network 110 or another network, or network configurations for the second local network device 132 are changed.

The computing device 101 may evaluate the second signal or message to identify or determine the information within the second signal or message and record or store certain portions of the second signal or message. For example, the computing device 101 may determine the first IP address (e.g., the first static IP address) associated with the second local network device 132 in the second message and may store an association of the first IP address to the second local network device 132 (e.g., the second device identifier, such as the MAC address, for the second local network device 132) in a database, such as the IP addresses 106 portion of the database 105 of the computing device 101. For example, the computing device 101 may determine the block size and/or configuration for the first IP address associated with the second local network device 132 in the second message and may store an association of the block size and/or configuration for the first IP address to the second local network device 132 (e.g., the second device identifier, such as the MAC address, for the second local network device 132) in a database, such as the block configurations 107 portion of the database 105 of the computing device 101. For example, the computing device 101 may determine the current authentication key and authentication time associated with the second local network device 132 in the second message and may store an association of the authentication key and authentication time to the second local network device 132 (e.g., the second device identifier, such as the MAC address, for the second local network device 132) in a database, such as the authentication keys 108 portion of the database 105 of the computing device 101.

At 630, a determination may be made that the first local network device 122 and the second local network device 132 are both associated or provisioned with the first IP address (e.g., the first static IP address). For example, the determination may be made by the computing device 101 on any other computing device described herein. For example, the determination may be made based on the computing device 101 receiving one or more of the first message comprising the first IP address (e.g., the first static IP address) or the second message comprising the first IP address. For example, the determination may be based on one or more of the first device identifier or the second device identifier.

For example, the computing device 101 may determine that the first IP address provisioned at and associated with the first local network device 122 is the same as the first IP address provisioned at and associated with the second local network device 132. For example, the computing device 101 may compare the first IP address received and associated with the second local network device 132 to the stored IP addresses (e.g., stored static IP addresses which includes the first IP address previously received and stored by the computing device 101 for the first local network device 122) provisioned at and associated with other local network devices to determine if the first IP address is the same as, and thus conflicts with, any one or more of the stored IP addresses in, for example the IP addresses 106 portion of the database 105. For example, the computing device 101 may determine that both the first local network device 122 and the second local network device 132 are associated or provisioned with the first IP address based on the first IP address stored and associated with the first local network device 122 matching or being the same as (and thus conflicts with) the first IP address associated with the second local network device 132.

At 640, the first IP address may be determined to be correctly assigned to the second local network device 132. For example, the determination may be made by the computing device 101 or any other computing device described herein. For example, the determination may be based on the second device identifier (e.g., the MAC address) identifying and/or associated with the second local network device 132. For example, the computing device 101 may determine which local network device 122, 132 should be associated with (e.g., is the correct current owner/user of) the first IP address. For example, the computing device 101 may determine, either based on the second signal or message or based on the stored first IP address in the database 105, the second device identifier (e.g., the MAC address) for the second local network device 132. For example, the computing device 101 may determine, either based on the first signal or message, the second signal or message, and/or the stored first IP address in the database 105, the device identifier (e.g., the MAC address) for each of the local network devices having the same first IP address. For example, the computing device 101 may determine or retrieve the first and second device identifiers for the first local network device 122 and the second local network device 132 from the IP addresses 106 portion of the database 105.

For example, the computing device 101, such as the billing system 103, may determine, based on the first device identifier for the first local network device 122, account information associated with the first local network device 122. For example, the computing device 101, such as the billing system 103, may determine, based on the second device identifier for the second local network device 132, account information associated with the second local network device 132. For example, the account information may comprise an account number, a customer number, a customer name (e.g., a business name), a user ID, or the like.

The computing device 101 may determine the correct IP addresses (e.g., correct static IP addresses) associated with each of the first local network device 122 and the second local network device 132. For example, the computing device 101, such as the IP management system 104, may determine the IP addresses associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the IP addresses associated with the first local network device 122. For example, the IP management system 104 may determine that the first IP address (e.g., the first static IP address) should not be associated with or provisioned on the first local network device 122. For example, the determination may be made based on the first IP address not being in a database or table of IP address associated with or provisioned on the first local network device 122.

For example, the computing device 101, such as the IP management system 104, may determine the IP addresses associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the IP addresses associated with the second local network device 132. For example, the IP management system 104 may determine that the first IP address (e.g., the first static IP address) is among the IP addresses correctly associated with the second local network device 132 and is thus, assigned to the second local network device 132. For example, the determination may be made based on the first IP address being in a database or table of IP address associated with or provisioned on the second local network device 132.

The computing device 101 may further determine if the current block size for the particular IP address and/or the authentication key for the particular local network device 122, 132 are correct. For example, the computing device 101, such as the IP management system 104, may determine the correct block size for the particular IP address (e.g., one or more of the static IP addresses correctly provisioned on the first local network device 122) and determine if the correct block size is different from the current block size for the particular IP address associated with the first local network device 122 based on the account information associated with the first local network device 122. For example, the IP management system 104 may determine, based on one or more of the account number, customer number, customer name, or user ID associated with the first local network device 122, user device 120 and/or business at the first location, the correct block size for the particular IP address and determine if the correct block size is different from the current block size for the particular IP address associated with the first local network device 122.

For example, the computing device 101, such as the IP management system 104, may determine the correct block size for the particular IP address (e.g., one or more of the static IP addresses correctly provisioned on the second network device 132) and determine if the correct block size is different from the current block size for the particular IP address associated with the second local network device 132 based on the account information associated with the second local network device 132. For example, the IP management system 104 may determine, based on one or more of the account number, customer number, customer name, or user ID associated with the second local network device 132, user device 130 and/or business at the second location, the correct block size for the particular IP address and determine if the correct block size is different from the current block size for the particular IP address associated with the second local network device 132.

For example, the computing device 101, such as the IP management system 104, may determine the correct authentication key for the first local network device 122 and determine if the correct authentication key is different from the current authentication key for the first local network device 122 based on the account information associated with the first local network device 122. For example, the IP management system 104 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122. For example, the computing device 101, such as the IP management system 104, may determine the correct authentication key for the second local network device 132 and determine if the correct authentication key is different from the current authentication key for the second local network device 132 based on the account information associated with the second local network device 132. For example, the IP management system 104 may determine, based on one or more of the account number, customer number, customer name, or user ID associated with the second local network device 132, user device 130 and/or business at the second location, the correct authentication key for the second local network device 132 and determine if the correct authentication key is different from the current authentication key for the second local network device 132.

The computing device 101 may associate and store the correct IP addresses, authentication key, and/or the correct block size for each of the provisioned IP addresses for the first local network device 122 and the second local network device 132 with a device identifier (e.g., the first device identifier or the second device identifier) of the particular first local network device 122 or second local network device 132. For example, the correct IP addresses, authentication key, and the correct block size may be stored in the database 105.

At 650, the first IP address may be caused to be removed from or deprovisioned from the first local network device 122. For example, the computing device 101 may cause the first IP address to be removed or deprovisioned from the first local network device 122. The first IP address may be caused to be removed or deprovisioned from the first local network device 122 based on the first IP address being assigned to or correctly provisioned on the second local network device 132. For example, the computing device 101 may determine, based on the first IP address being assigned to or correctly provisioned on the second local network device 132 and/or based on determining the first IP address should not be associated with or provisioned on the first local network device 122, that a deprovisioning message should be sent to the first local network device 122. The computing device 101 may generate a deprovisioning message to remove or deprovision the first IP address (e.g., the first static IP address) from the first local network device 122. The deprovisioning message may include an indication for the first local network device 122 to remove or deprovision the first IP address from or disassociate the first IP address from the first local network device 122. The computing device 101 may send the deprovisioning message to the first local network device 122 via the network 110 or another network to cause the first IP address to be removed from the first local network device 122.

The first local network device 122 may receive the deprovisioning message from the computing device 101. The first local network device 122 may, based on the deprovisioning message, remove or deprovision the first IP address (e.g., the first static IP address) from the first local network device 122.

The deprovisioning message may further include, or the computing device 101 may send a separate message comprising the correct block size for each correct IP address associated with the first local network device 122 and/or the correct authentication key for the first local network device 122. The first local network device 122 may receive the deprovisioning message or the additional message and update the block sizes and/or authentication key at the first local network device 122.

For example, when the first IP address associated with or provisioned on the network device is removed from the network device, a new, correct IP address to associate or provision on the network device may be identified. For example, the new, correct IP address to be associated or provisioned on the network device may be identified from and/or by the IP management system 104, 118. The network device (e.g., the first local network device 122) may be associated with or provisioned with the new, correct IP address. For example, the computing device 101 or the remote network device 124 may send a provisioning signal, message, or indication to network device that comprises or indicates the new, correct IP address for the network device. Subsequent to the network device being associated with or provisioned with the new, correct IP address (e.g., the correct static IP address or addresses for the network device), the network device may send a subsequent signal or message to the remote network device 124. The subsequent message or signal may comprise the one or more of new, correct static IP addresses provisioned or associated with the network device (e.g., the first local network device 122), the authentication key associated with the network device, the device identifier (e.g., the MAC address) identifying or associated with the network device, the block size for each new, correct static IP address provisioned or associated with the network device, and/or a time the network device was configured. For example, the subsequent signal or message may be a push notification from the network device, such as a RIPv2 update message. The remote network device 124 may receive the subsequent signal or message and update the routing table to indicate that the network device (e.g., the first local network device) is associated with or provisioned with the new, correct static IP addresses indicated in the subsequent signal or message.

For example, when the first IP address associated with or provisioned on the network device is removed from the network device, it may be determined that there is no current IP address (e.g., static IP address) to associate with or provision to the network device (e.g., the first local network device 122). For example, when the first IP address is removed from the network device, certain configuration settings and/or memory may also be removed from the network device. Removal of these configuration settings and/or memory may prevent or stop the network device from sending a subsequent signal or message (e.g., a RIPv2 update message) to the remote network device 124. The remote network device 124 may be configured to remove a network device, such as the first local network device 122 from the routing table for the remote network device 124 if an update is not received from the network device for an amount of time. For example, the amount of time may be a predetermined and/or threshold amount of time. For example, the amount of time may be any amount of time within the range of 1 second to 600 seconds, and preferable about 300 seconds.

The computing device 101 may send another message to the second local network device 132. For example, the message may comprise the correct block size for each correct IP address associated with the second local network device 132 and/or the correct authentication key for the second local network device 132. The second local network device 132 may receive the message and update the block sizes and/or authentication key at the second local network device 132.

Figure 7:
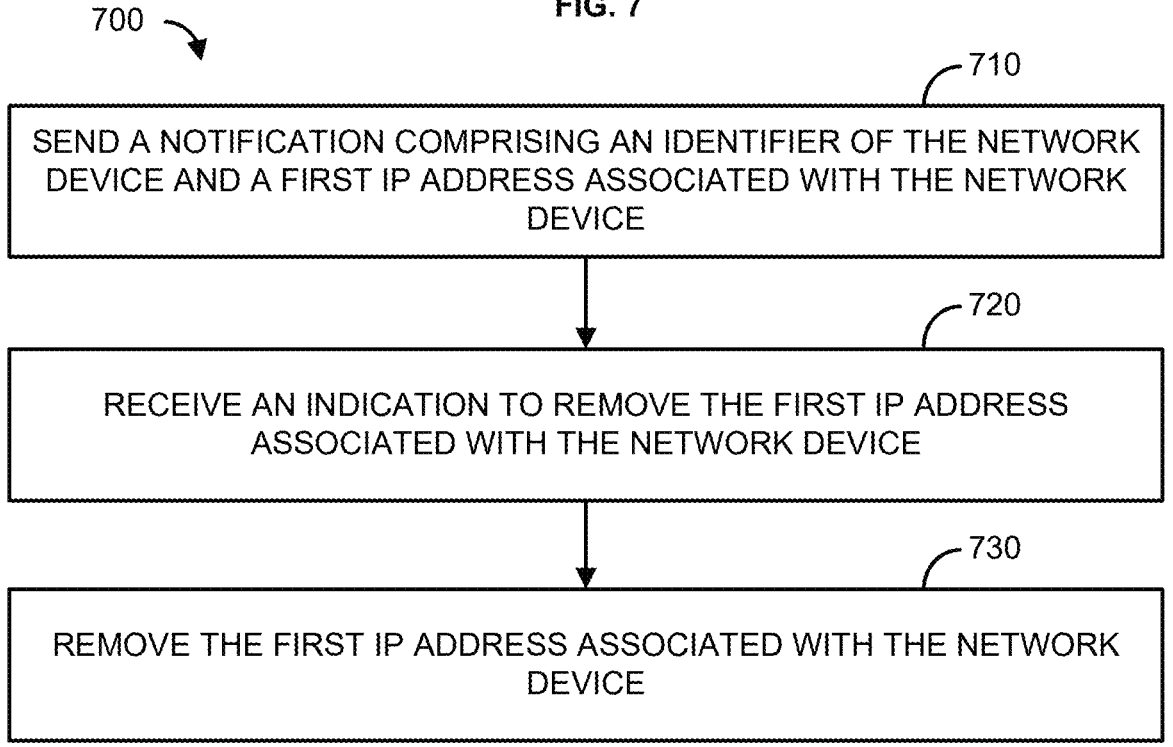
FIG. 7 shows a flowchart of an example method.

FIG. 7 shows a flowchart of an example method 700 for correcting duplicate network identifiers or device identifiers (e.g., indicating duplicate network routes). For example, the duplicate network identifiers or device identifiers may be corrected by a computing device (e.g., the first local network device 122 or the second local network device 132). At 710, a notification comprising an identifier of the local network device (e.g., the first local network device 122) and a first IP address associated with or provisioned at the local network device may be sent. For example, the first local network device 122 may send the identifier of the first local network device 122 and the first IP address (e.g., a first static IP address) associated with or provisioned at the first local network device 122 to one or more of the computing device 101 or the remote network device 124 via the network 110 or another network. For example, the notification may comprise a signal or message comprising the identifier of the first local network device 122 and one or more IP addresses (including the first IP address) associated with or provisioned at the first local network device 122.

For example, the signal or message may comprise the one or more IP addresses provisioned or associated with the first local network device 122, an authentication key associated with the first local network device 122, the device identifier (e.g., the MAC address) identifying or associated with the first local network device 122, the block size for each IP address provisioned or associated with the first local network device 122, and/or a time the first local network device 122 was configured. For example, the signal or message may be a push notification from the first local network device 122. For example, the signal or message may comprise one of a webpa push notification or a RIPv2 update message. For example, the signal or message may be sent by the first local network device 122 when one or more of the following occur: the first local network device 122 is receives or is provisioned with a new IP address (e.g., a new static IP address), the first local network device 122 reboots or restarts, the first local network device 122 is initially coupled to or recoupled to the network 110 or another network, or network configurations for the first local network device 122 are changed. For example, the signal or message may be sent by the first local network device 122 on a periodic basis. For example, the period may be every 30 seconds or any other desired time period. For example, the signal or message may be sent by the first local network device 122 without the first local network device 122 receiving a request for the information within the signal or message.

For example, the identifier of the first local network device 122 may comprise a MAC address for the first local network device 122. For example, the first local network device 122 may be associated with the first user device 120 at the first location. The first location may be a premises, such as a business premises, an office for a business, or a computing center for a business. The first local network device 122 may be located at the first location. For example, the first local network device 122 may comprise a router.

At 720, an indication to remove the first IP address associated with the network device, such as the first local network device 122, may be received. For example, the indication may be received from the computing device 101 or another computing device via the network 110 or another network. For example, the indication may be received by the first local network device 122 from the computing device 101 via the remote network device 124.

For example, the indication may comprise a deprovisioning message. For example, the deprovisioning message may comprise an indication for the first local network device 122 to remove or deprovision the first IP address (e.g., the first static IP address) from or disassociate the first IP address from the first local network device 122. For example, the first local network device 122 may receive the deprovisioning message based on a determination that the first IP address is associated with and/or provisioned to another local network device (e.g., the second local network device 124. For example, the first local network device 122 may receive the deprovisioning message based on a determination that the first local network device 122 is no longer associated with or should no longer be provisioned with the first IP address.

At 730, the first IP address associated with or provisioned on the network device (e.g., the first local network device 122) may be removed from the network device. For example, the first IP address may be removed or deprovisioned from the first local network device 122 based on receiving the indication to remove the first IP address from the computing device 101 and/or the remote network device 124.

The deprovisioning message received from the computing device 101 may further include, or the first local network device 122 may receive a separate message from the computing device 101 comprising the correct block size for each correct IP address associated with the first local network device 122 and/or the correct authentication key for the first local network device 122. For example, the correct block size for each correct IP address (e.g., each correct static IP address) associated with the first local network device 122 may be received in the message based on one or more of the block sizes indicated in the signal or message of 710 being determined to be incorrect. For example, the computing device 101 or the computing device 114 may determine that the one or more block sizes in the signal or message 710 are incorrect. For example, the correct authentication key associated with the first local network device 122 may be received in the message based the authentication key indicated in the signal or message of 710 being determined to be incorrect. For example, the computing device 101 or the computing device 114 may determine that the authentication key in the signal or message of 710 is incorrect. The first local network device 122 may receive the deprovisioning message or the additional message and update the block sizes and/or authentication key in the memory of the first local network device 122.

For example, when the first IP address associated with or provisioned on the network device is removed from the network device, a new, correct IP address to associate or provision on the network device may be identified. For example, the new, correct IP address to be associated or provisioned on the network device may be identified from and/or by the IP management system 104, 118. The network device (e.g., the first local network device 122) may be associated with or provisioned with the new, correct IP address. For example, the computing device 101 or the remote network device 124 may send a provisioning signal, message, or indication to network device that comprises or indicates the new, correct IP address for the network device. Subsequent to the network device being associated with or provisioned with the new, correct IP address (e.g., the correct static IP address or addresses for the network device), the network device may send a subsequent signal or message to the remote network device 124. The subsequent message or signal may comprise the one or more of new, correct static IP addresses provisioned or associated with the network device (e.g., the first local network device 122), the authentication key associated with the network device, the device identifier (e.g., the MAC address) identifying or associated with the network device, the block size for each new, correct static IP address provisioned or associated with the network device, and/or a time the network device was configured. For example, the subsequent signal or message may be a push notification from the network device, such as a RIPv2 update message. The remote network device 124 may receive the subsequent signal or message and update the routing table to indicate that the network device (e.g., the first local network device) is associated with or provisioned with the new, correct static IP addresses indicated in the subsequent signal or message.

For example, when the first IP address associated with or provisioned on the network device is removed from the network device, it may be determined that there is no current IP address (e.g., static IP address) to associate with or provision to the network device (e.g., the first local network device 122). For example, when the first IP address is removed from the network device, certain configuration settings and/or memory may also be removed from the network device. Removal of these configuration settings and/or memory may prevent or stop the network device from sending a subsequent signal or message (e.g., a RIPv2 update message) to the remote network device 124. The remote network device 124 may be configured to remove a network device, such as the first local network device 122 from the routing table for the remote network device 124 if an update is not received from the network device for an amount of time. For example, the amount of time may be a predetermined and/or threshold amount of time. For example, the amount of time may be any amount of time within the range of 1 second to 600 seconds, and preferable about 300 seconds.

Figure 8:
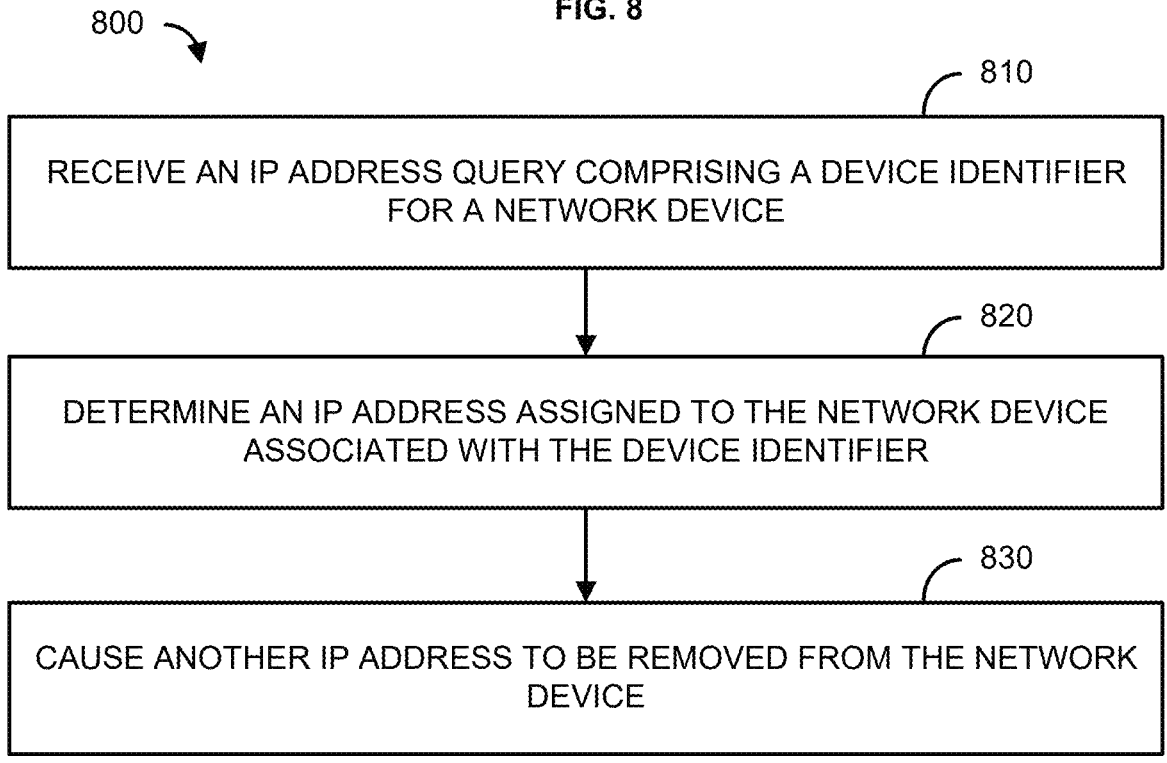
FIG. 8 shows a flowchart of an example method.

FIG. 8 shows a flowchart of an example method 800 for determining and correcting duplicate network identifiers or device identifiers. For example, the duplicate network identifiers or device identifiers (e.g., indicating duplicate network routes) may be determined and corrected by a computing device, such as the computing device 101 or the computing device 114, or any other computing device described herein. At 810, an IP address query for a network device may be received. For example, the IP address query may be received by the computing device 114 from the computing device 101 via the network 110 or another network. For example, the network device may comprise the first local network device 122 and/or the second local network device 132. For example, the IP address query may comprise a signal or message received by the computing device 114 from the computing device 101. For example, the signal or message may comprise the device identifier for the first local network device 122. For example, the computing device 114 may receive the IP address query based on a determination that first local network device 122 and at least one other local network device are both associated with or provisioned with the same IP address (e.g., the same static IP address).

At 820, an IP address (e.g., an IP static address) assigned or provisioned to the first local network device 122, associated with the device identifier, may be determined. For example, the IP address may comprises a plurality of IP addresses that should be provisioned to or associated with the first local network device 122. For example, the IP address may be determined by the computing device 114 or any other computing device described herein. For example, the billing system 116 or another portion of the computing device 114 may receive the IP address query. For example, the billing system 116 may receive the device identifier for the first local network device 122 from the IP address query. For example, the billing system 116 may determine, based on the device identifier for the first local network device 122, account information associated with the first local network device 122. For example, the account information may comprise an account number, a customer number, a customer name (e.g., a business name), a user ID, or the like.

The computing device 114 may determine the one or more IP addresses associated with the first local network device 122. For example, the computing device 114, such as the IP management system 118, may determine the one or more IP addresses associated with the first local network device 122 based on the account information associated with the first local network device 122. For example, the IP management system 118 may determine, based on one or more of the account number, customer number, customer name, or user ID associated with the first local network device 122, user device 120 and/or business at the first location, the one or more IP addresses (e.g., one or more static IP addresses) associated with the first local network device 122.

The computing device 114 may further determine if the current block size for the particular IP address and/or the authentication key for the particular local network device 122, 132 are correct. For example, the computing device 114, such as the IP management system 118, may determine the correct block size for each particular IP address provisioned to or associated with the first local network device 122 and determine if the correct block size is different from the current block size for the particular IP address provisioned to or associated with the first local network device 122 based on the account information associated with the first local network device 122. For example, the IP management system 118 may determine, based on one or more of the account number, customer number, customer name, or user ID associated with the first local network device 122, user device 120 and/or business at the first location, the correct block size for the each particular IP address provisioned to or associated with the first local network device 122 and determine if the correct block size is different from the current block size for each particular IP address provisioned to or associated with the first local network device 122.

For example, the computing device 114, such as the IP management system 118, may further determine the correct authentication key for the first local network device 122 and determine if the correct authentication key is different from the current authentication key for the first local network device 122 based on the account information associated with the first local network device 122. For example, the IP management system 118 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122.

The computing device 114 may associate and store the correct IP addresses, authentication key and the correct block size for each of the provisioned IP addresses for the first local network device 122 with a device identifier of the first local network device 122. For example, the correct IP addresses, authentication key, and the correct block size may be stored in a database associated with the computing device 114.

At 830, the computing device 114 may cause another IP address (e.g., another static IP address) to be removed or deprovisioned from the first local network device 122. For example, the computing device 114 may cause the another IP address to be removed or deprovisioned from the first local network device 122 by sending a signal or message to the computing device 101 via the network 110 or another network. The signal or message may comprise an indication of the correct IP addresses (e.g., correct static IP addresses) or incorrect IP addresses associated with or provisioned to the first local network device 122. For example, the signal or message may comprise one or more of the correct block sizes for each IP address, and/or correct authentication key associated with the first local network device 122.

For example, if the current IP addresses (e.g., current static IP addresses) associated with or provisioned to the first local network device 122 includes a first IP address that is not included in the list of correct IP addresses associated with or provisioned to the first local network device 122 and sent by the computing device 114 to the computing device 101, then the first IP address will be removed or deprovisioned from the first local network device 122. For example, the first IP address will be removed or deprovisioned from the first local network device based on the computing device 101 sending a deprovisioning message to the first local network device 122. For example, the deprovisioning message may be sent based on the computing device 101 receiving the list of correct IP addresses or incorrect IP addresses associated with or provisioned to the first local network device 122.

For example, the computing device 114 may further cause the authentication key for the first local network device 122 to be updated to the correct authentication key. For example, the computing device may further cause the one or more block sizes for the correct IP addresses associated with or provisioned to the first local network device to be updated to the correct block size. For example, the computing device 114 may cause the authentication key and/or the one or more block sizes to be updated at the first local network device 122 based on sending the signal or message comprising the correct authentication key and/or the correct one or more block sizes from the computing device 114 to the computing device 101.

Figure 9:
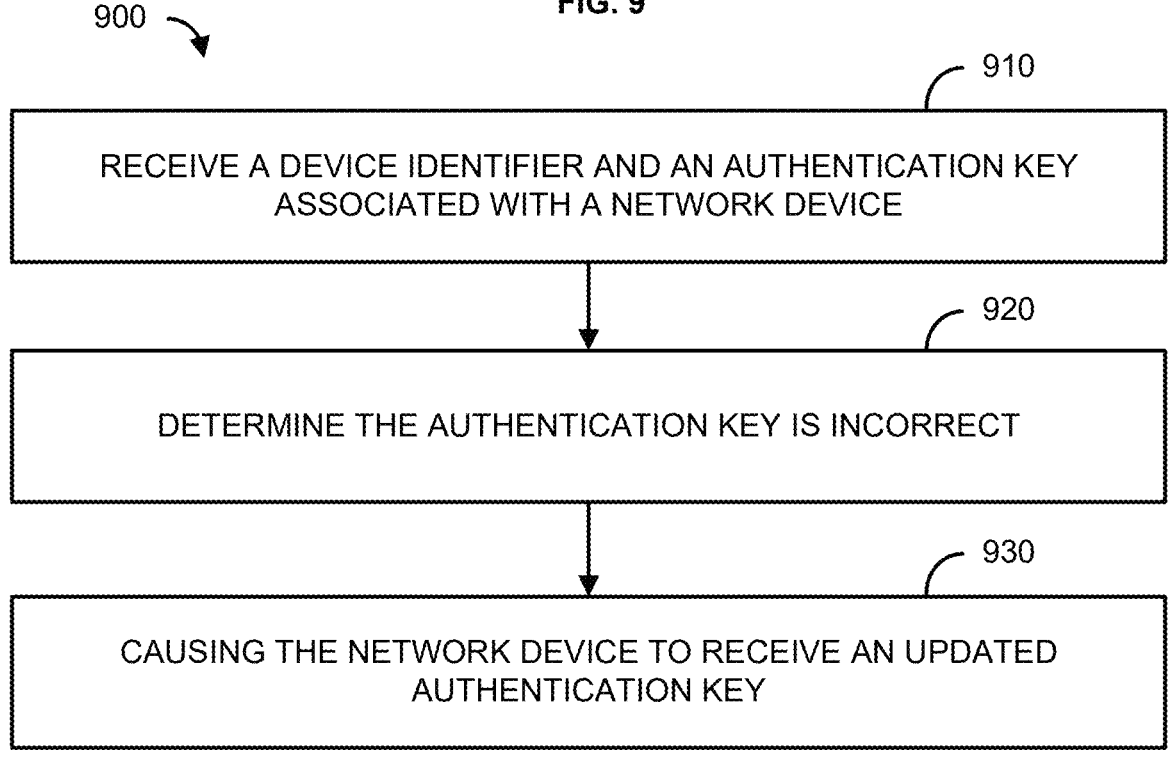
FIG. 9 shows a flowchart of an example method.

FIG. 9 shows a flowchart of an example method 900 for determining and correcting errors in authentication keys for a network device. For example, the errors in the authentication keys may be determined and corrected by a computing device, such as the computing device 101 or the computing device 114, or any other computing device described herein. At 910, a device identifier and an authentication key associated with the first local network device 122 may be received. For example, the device identifier and the authentication key may be received by the computing device 101, the computing device 114, or any other computing device described herein. For example, the device identifier and the authentication key may be received by the computing device 101 from the first local network device 122 via the network 110 or another network. For example, the device identifier and the authentication key may be received from the first local network device 122 via the remote network device 124. For example, the device identifier and the authentication key may be received by the computing device 114 from the computing device 101 via the network 110 or another network. The device identifier may comprise a MAC address for the first local network device 122.

The first local network device 122 may be associated with a first business at a first location. The device identifier and the authentication key may be received as part of a first signal or message sent by the first local network device 122 and received by the computing device 101. For example, the first signal or message may comprise one or more first IP addresses (e.g., one or more first static IP addresses) provisioned or associated with the first local network device 122, the authentication key associated with the first local network device 122, the device identifier identifying or associated with the first local network device 122, the block size for each IP address provisioned or associated with the first local network device 122, and/or a time the first local network device 122 was configured. For example, the first signal or message may be a push notification received by the computing device 101. For example, the first signal or message may comprise a webpa push notification or a RIPv2 update message. The first signal or message may be received by the computing device 101 when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed. For example, the first signal or message may be received on a periodic basis from the first local network device 122, such as every 30 seconds or any other desired period.

The computing device 101 or the computing device 114 may evaluate the first signal or message to identify or determine the information within the first signal or message and record or store certain portions of the first signal or message. For example, the computing device 101 may determine the authentication key in the first message and may store an association of the authentication key to the first local network device 122 (e.g., the device identifier for the first local network device 122) in a database, such as the authentication key 108 portion of the database 105. For example, the computing device 101 may determine the first IP address (e.g., the first static IP address) associated with the first local network device 122 in the first message and may store an association of the first IP address to the first local network device 122 (e.g., the device identifier for the first local network device 122) in a database, such as the IP addresses 106 portion of the database 105. For example, the computing device 101 may determine the block size and/or configuration for the first IP address associated with the first local network device 122 in the first message and may store an association of the block size and/or configuration for the first IP address to the first local network device 122 (e.g., the device identifier for the first local network device 122) in a database, such as the block configurations 107 portion of the database 105 of the computing device 101.

At 920, the authentication key may be determined to be incorrect for the first local network device 122. For example, the computing device 101, the computing device 114, or any other computing device described herein may determine the authentication key is incorrect for the first local network device 122. The authentication key may be determined to be incorrect based on one or more of the device identifier for the first local network device 122 and the authentication key for the first local network device 122. For example, the billing system 103, 116 or another portion of the computing device 101, 114 may receive the device identifier and the authentication key. For example, the billing system 103, 116 may determine, based on the device identifier for the first local network device 122, account information associated with the first local network device 122. For example, the account information may comprise an account number, a customer number, a customer name (e.g., a business name), a user ID, or the like.

The computing device 101, 114, such as the IP management system 104, 118, may determine the correct authentication key for the first local network device 122 and determine if the correct authentication key is different from the current authentication key for the first local network device 122 based on the account information associated with the first local network device 122. For example, the IP management system 104, 118 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122.

Furthermore, the computing device 101, 114 may determine the one or more IP addresses associated with or provisioned to the first local network device 122. For example, the IP management system 104, 118 may determine the correct IP addresses (e.g., correct static IP addresses associated with the first local network device 122 based on the account information associated with the first local network device 122. For example, the IP management system 104, 118 may determine, based on one or more of the account number, customer number, customer name, or user ID associated with the first local network device 122, user device 120 and/or business at the first location, the IP addresses associated with the first local network device 122.

Furthermore, the computing device 101, 114 may determine if the current block size for the particular IP address is correct. For example, the IP management system 104, 118, may determine the correct block size for the particular IP address and determine if the correct block size is different from the current block size for the particular IP address associated with the first local network device 122 based on the account information associated with the first local network device 122. For example, the IP management system 104, 118 may determine, based on one or more of the account number, customer number, customer name, or user ID associated with the first local network device 122, user device 120 and/or business at the first location, the correct block size for the particular static IP address and determine if the correct block size is different from the current block size for the particular IP address associated with the first local network device 122.

The computing device 114 and/or the computing device 101 may associate and store the correct authentication key, IP addresses, and/or the correct block size for each of the provisioned IP addresses for the first local network device 122 with the device identifier of the first local network device 122.

At 930, the first local network device 122 may be caused to receive an updated authentication key. For example, the computing device 101 or the computing device 114 may cause the first local network device 122 to receive the updated, correct authentication key. For example, the computing device 101 may send a message to the first local network device 122. For example, the message may comprise the correct authentication key for the first local network device 122. The first local network device 122 may receive the message and update the authentication key at the first local network device 122.

The first local network device 122 may be caused to receive updated block sizes for each correct IP address associated with the first local network device 122. For example, the message may further comprise the correct block size for each correct IP address associated with the first local network device 122. The first local network device 122 may receive the message and update the correct block sizes for each of the correct IP addresses at the first local network device 122.

The first local network device 122 may be caused to deprovision a first IP address (e.g., a first static IP address) from the first local network device. For example, the message may comprise a deprovisioning message. The deprovisioning message indicate that the first IP address should be removed or deprovisioned from the first local network device 122. The first local network device 122 may receive the deprovisioning message. Based on receiving the deprovisioning message, the first local network device 122 may remove the first IP address as an address associated with or provisioned to the first local network device 122.

Figure 10:
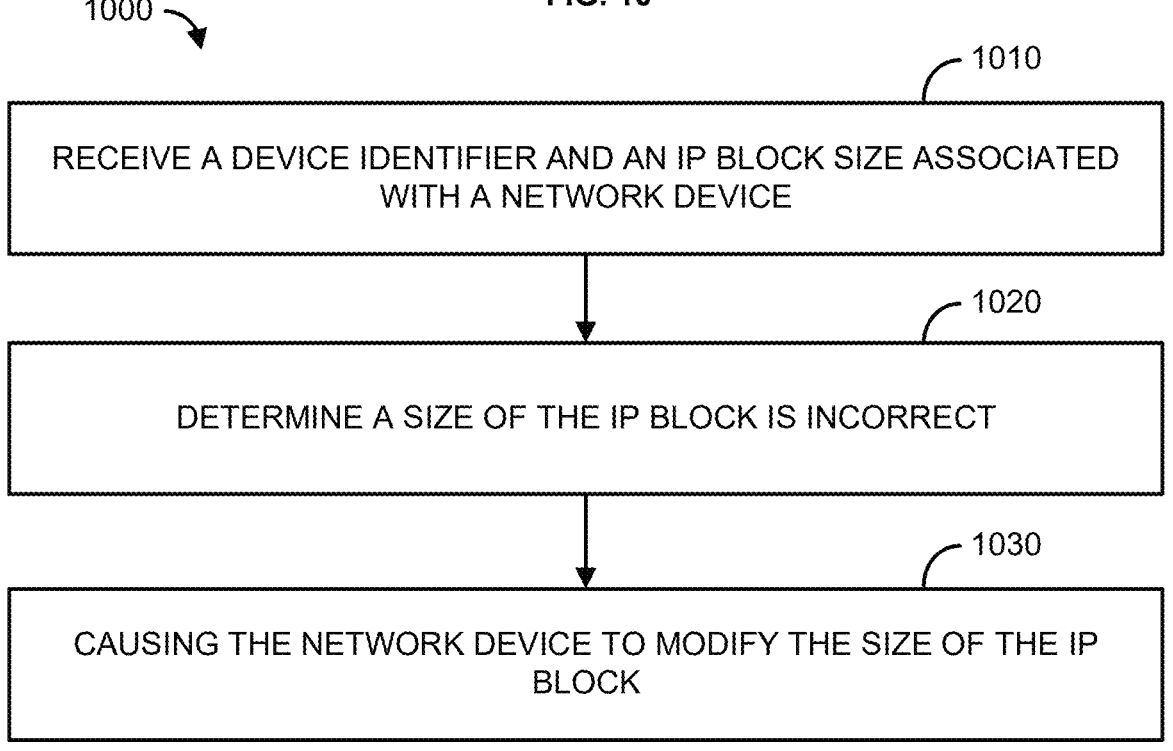
FIG. 10 shows a flowchart of an example method.

FIG. 10 shows a flowchart of an example method 1000 for determining and correcting errors in IP block sizes for a network device. For example, the errors in the IP block sizes may be determined and corrected by a computing device, such as the computing device 101, the computing device 114, or any other computing device described herein. At 1010, a device identifier associated with the first local network device 122 and an IP block size associated with and IP address provisioned to or associated with the first local network device 122 may be received. For example, the device identifier and the IP block size may be received by the computing device 101, the computing device 114, or any other computing device described herein. For example, the device identifier and the IP block size may be received by the computing device 101 from the first local network device 122 via the network 110 or another network. For example, the device identifier and the IP block size may be received from the first local network device 122 via the remote network device 124. For example, the device identifier and the IP block size may be received by the computing device 114 from the computing device 101 via the network 110 or another network. The device identifier may comprise a MAC address for the first local network device 122.

The first local network device 122 may be associated with a first business at a first location. The device identifier and the IP block size may be received as part of a first signal or message sent by the first local network device 122 and received by the computing device 101. For example, the first signal or message may comprise one or more first IP addresses (e.g., one or more first static IP addresses) provisioned or associated with the first local network device 122, an authentication key associated with the first local network device 122, the device identifier identifying or associated with the first local network device 122, the block size for each IP address provisioned or associated with the first local network device 122, and/or a time the first local network device 122 was configured. For example, the first signal or message may be a push notification received by the computing device 101. For example, the first signal or message may comprise a webpa push notification or a RIPv2 update message. The first signal or message may be received by the computing device 101 when one or more of the following occur: the first local network device 122 is provided with a new static IP address, the first local network device 122 is rebooted or restarted, the first local network device 122 is initially coupled to or recoupled to the network 110 or another network, or network configurations for the first local network device 122 are changed. For example, the first signal or message may be received on a periodic basis from the first local network device 122, such as every 30 seconds or any other desired period.

The computing device 101 or the computing device 114 may evaluate the first signal or message to identify or determine the information within the first signal or message and record or store certain portions of the first signal or message. For example, the computing device 101 may determine the IP block size in the first message and may store an association of the IP block size of the corresponding IP address and to the first local network device 122 (e.g., the device identifier for the first local network device 122) in a database, such as the block configuration 107 portion of the database 105. For example, the computing device 101 may determine the first IP address (e.g., the first static IP address) associated with the first local network device 122 in the first message and may store an association of the first IP address to the first local network device 122 (e.g., the device identifier for the first local network device 122) in a data-base, such as the IP addresses 106 portion of the database 105. For example, the computing device 101 may determine the authentication key associated with the first local network device 122 in the first message and may store an association of the authentication key to the first local network device 122 (e.g., the device identifier for the first local network device 122) in a database, such as the authentication key 108 portion of the database 105.

At 1020, the IP block size may be determined to be incorrect for an associated IP address (e.g., a static IP address) provisioned to or associated with the first local network device 122. For example, the computing device 101, the computing device 114, or any other computing device described herein may determine the IP block size is incorrect for a particular IP address for the first local network device 122. For example, the IP management system 104, 118, may determine the correct IP block size for the particular IP address and determine if the correct IP block size is different from the current IP block size for the particular IP address associated with the first local network device 122 based on the account information associated with the first local network device 122. For example, the IP management system 104, 118 may determine, based on one or more of the account number, customer number, customer name, or user ID associated with the first local network device 122, user device 120 and/or business at the first location, the correct IP block size for the particular static IP address and determine if the correct IP block size is different from the current IP block size for the particular IP address associated with the first local network device 122.

Furthermore, the authentication key may be determined to be incorrect for the first local network device 122. For example, the computing device 101, the computing device 114, or any other computing device described herein may determine the authentication key is incorrect for the first local network device 122. The authentication key may be determined to be incorrect based on one or more of the device identifier for the first local network device 122 and the authentication key for the first local network device 122. For example, the billing system 103, 116 or another portion of the computing device 101, 114 may receive the device identifier and the authentication key. For example, the billing system 103, 116 may determine, based on the device identifier for the first local network device 122, account information associated with the first local network device 122. For example, the account information may comprise an account number, a customer number, a customer name (e.g., a business name), a user ID, or the like.

The computing device 101, 114, such as the IP management system 104, 118, may determine the correct authentication key for the first local network device 122 and determine if the correct authentication key is different from the current authentication key for the first local network device 122 based on the account information associated with the first local network device 122. For example, the IP management system 104, 118 may determine, based on one or more of the account number, customer number, customer name, or user ID associated with the first local network device 122, user device 120 and/or business at the first location, the correct authentication key for the first local network device 122 and determine if the correct authentication key is different from the current authentication key for the first local network device 122.

Furthermore, the computing device 101, 114 may determine the one or more IP addresses associated with or provisioned to the first local network device 122. For example, the IP management system 104, 118 may determine the correct IP addresses (e.g., correct static IP addresses associated with the first local network device 122 based on the account information associated with the first local network device 122. For example, the IP management system 104, 118 may determine, based on one or more of the account number, customer number, customer name, or user ID associated with the first local network device 122, user device 120 and/or business at the first location, the IP addresses associated with the first local network device 122.

The computing device 114 and/or the computing device 101 may associate and store the correct authentication key, IP addresses, and/or the correct block size for each of the provisioned IP addresses for the first local network device 122 with the device identifier of the first local network device 122.

At 1030, the first local network device 122 may be caused to receive updated block sizes for each correct IP address associated with the first local network device 122. For example, the computing device 101 or the computing device 114 may cause the first local network device 122 to receive the updated block sizes for each correct IP address associated with the first local network device 122. For example, the computing device 101 may send a message to the first local network device 122. For example, the message may comprise the correct block size for each correct IP address associated with the first local network device 122. The first local network device 122 may receive the message and update the correct block sizes for each of the correct IP addresses at the first local network device 122.

The first local network device 122 may be caused to receive an updated authentication key. For example, the computing device 101 or the computing device 114 may cause the first local network device 122 to receive the updated, correct authentication key. For example, the message may further comprise the correct authentication key for the first local network device 122. The first local network device 122 may receive the message and update the authentication key at the first local network device 122.

The first local network device 122 may be caused to deprovision a first IP address (e.g., a first static IP address) from the first local network device 122. For example, the message may comprise a deprovisioning message. The deprovisioning message indicate that the first IP address should be removed or deprovisioned from the first local network device 122. The first local network device 122 may receive the deprovisioning message. Based on receiving the deprovisioning message, the first local network device 122 may remove the first IP address as an address associated with or provisioned to the first local network device 122.

Figure 11:
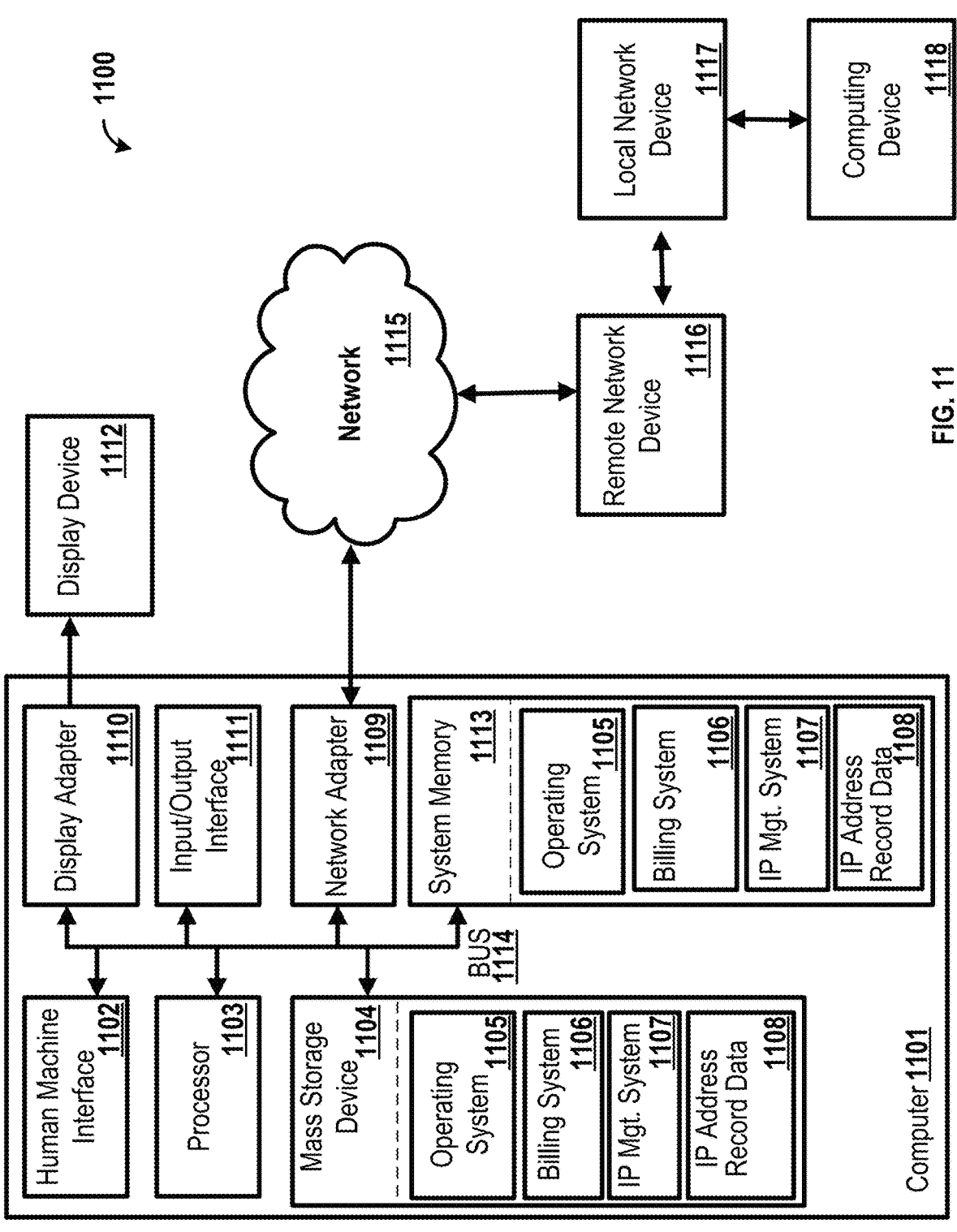
FIG. 11 shows a block diagram of an example system and computing device for identifying network identifiers.

FIG. 11 shows a block diagram of an example system 1100 and computer 1101 for determining and/or correcting duplicate network identifiers or device identifiers (e.g., indicating duplicate network routes). Any device/component described herein (e.g., the computing device 101, the computing device 114, the first local network device 122, the first remote network device 124, the second local network device 132, and/or the second remote network device 134) may be the computer 1101 as shown in FIG. 11.

The computer 1101 may include one or more processors 1103, a system memory 1113, and a bus 1114 that couples various components of the computer 1101 including the one or more processors 1103 to the system memory 1113. In the case of multiple processors 1103, the computer 1101 may utilize parallel computing.

The bus 1114 may include one or more of several possible types of bus structures, such as a memory bus, memory controller, a peripheral bus, an accelerated graphics port, and a processor or local bus using any of a variety of bus architectures.

The computer 1101 may operate on and/or include a variety of computer-readable media (e.g., non-transitory). Computer-readable media may be any available media that is accessible by the computer 1101 and includes, non-transitory, volatile and/or non-volatile media, removable and non-removable media. The system memory 1113 has computer-readable media in the form of volatile memory, such as random access memory (RAM), and/or non-volatile memory, such as read-only memory (ROM). The system memory 1113 may store data such as IP address record data 1108 and/or program modules such as an operating system 1105, the billing system 1106, and an IP management system 1107 that are accessible to and/or are operated on by the one or more processors 1103. The IP address record data 1108 may include IP addresses (e.g., static IP addresses) associated with one or more network devices, such as local network device 1117, block configuration data comprising block sizes for the associated IP addresses, and/or authorization key data associated with each of the one or more network devices.

The computer 1101 may also include other removable/non-removable, volatile/non-volatile computer storage media. The mass storage device 1104 may provide non-volatile storage of computer code, computer-readable instructions, data structures, program modules, and other data for the computer 1101. The mass storage device 1104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1104. For example, an operating system 1105, billing system 1106, and an IP management system 1107 may be stored on the mass storage device 1104. IP address record data 1108 may also be stored on the mass storage device 1104. The IP address record data 1108 may be stored in any of one or more databases known in the art. The databases may be centralized or distributed across multiple locations within the network 1115.

A user may enter commands and information into the computer 1101 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1103 via a human machine interface 1102 that is coupled to the bus 1114, but may be connected by other interface and bus structures, such as a parallel port, game port, an IEEE 1394 Port (also known as a Firewire port), a serial port, network adapter 1109, and/or a universal serial bus (USB).

A display device 1112 may also be connected to the bus 1114 via an interface, such as a display adapter 1110. It is contemplated that the computer 1101 may have more than one display adapter 1110 and the computer 1101 may have more than one display device 1112. A display device 1112 may be a monitor, an LCD (Liquid Crystal Display), light-emitting diode (LED) display, television, smart lens, smart glass, and/or a projector. In addition to the display device 1112, other output peripheral devices may comprise components such as speakers (not shown) and a printer (not shown) which may be connected to the computer 1101 via Input/Output Interface 1111. Any step and/or result of the methods may be output (or caused to be output) in any form to an output device. Such output may be any form of visual representation, including, but not limited to, textual, graphical, animation, audio, tactile, and the like. The display device 1112 and computer 1101 may be part of one device, or separate devices.

The computer 1101 may operate in a networked environment using logical connections to one or more remote computing devices 1118. The remote computing device 1118 may be a personal computer, computing station (e.g., workstation), portable computer (e.g., laptop, mobile phone, tablet device), smart television, set-top-box, smart device (e.g., smartphone, smartwatch, activity tracker, smart apparel, smart accessory), a server, a router, a network computer, a peer device, edge device or other common network nodes, and so on. Logical connections between the computer 1101 and a remote computing device 1118 may be made via one or more of a local network device 1117, a remote network device 1116, and/or a network 1115, such as a local area network (LAN) and/or a general wide area network (WAN). For example, the local network device 1117 may comprise a router, such as a business router. For example, the remote network device 1116 may comprise a CMTS. Such network connections with the computer 1101 may be through a network adapter 1109. A network adapter 1109 may be implemented in both wired and wireless environments. Such networking environments are conventional and commonplace in dwellings, offices, enterprise-wide computer networks, intranets, and the Internet.

Application programs and other executable program components such as the operating system 1105, the billing system 1106, and the IP management system 1107 are shown herein as discrete blocks, although it is recognized that such programs and components may reside at various times in different storage components of the computing device 1101, and are executed by the one or more processors 1103 of the computer 1101. An implementation of the billing system 1106 and/or IP management system 1107 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a computing device from a first network device, a device identifier associated with the first network device and a first static internet protocol (IP) address associated with the first network device;
determining, based on the first static IP address, that the first static IP address conflicts with a second static IP address associated with a second network device;
determining, based on the device identifier, the first static IP address is assigned to the first network device; and
causing, based on the first static IP address being assigned to the first network device, the second network device to remove the second static IP address from the second network device.

2. The method of claim 1, wherein the device identifier comprises a MAC address.

3. The method of claim 1, wherein causing the second network device to remove the second static IP address from the second network device comprises sending, to the second network device, a signal to deprovision the second static IP address from the second network device.

4. The method of claim 1, wherein the first static IP address and the second static IP address are the same.

5. The method of claim 1, further comprising receiving, from the second network device, the second static IP address associated with the second network device.

6. The method of claim 1, wherein determining the first static IP address conflicts with the second static IP address comprises determining, based on a comparison of the first static IP address to the second static IP address, the first static IP address is the same as the second static IP address.

7. The method of claim 1, wherein receiving the device identifier and the first static IP address comprises receiving, from the first network device, a push notification comprising the device identifier and the first static IP address.

8. The method of claim 1, wherein the first network device comprises a router.

9. The method of claim 1, further comprising:
determining, based on the device identifier, a size of a block associated with the first static IP address is incorrect; and
causing, based on the size of the block being incorrect, the first network device to modify the size of the block associated with the first static IP address.

10. The method of claim 1, further comprising:
receiving, from the first network device, an authentication key;
determining, based on the device identifier and the authentication key, the authentication key is incorrect; and
causing, based on the authentication key being incorrect, the first network device to receive an updated authentication key.

11. An apparatus comprising:
one or more processors; and
memory storing processor-executable instructions that, when executed by the one or more processors, cause the apparatus to:
receive, from a first network device, a device identifier associated with the first network device and a first static internet protocol (IP) address associated with the first network device;

determine, based on the first static IP address, that the first static IP address conflicts with a second static IP address associated with a second network device;

determine, based on the device identifier, the first static IP address is assigned to the first network device; and cause, based on the first static IP address being assigned to the first network device, the second network device to remove the second static IP address from the second network device.

12. The apparatus of claim 11, wherein the device identifier comprises a MAC address.

13. The apparatus of claim 11, wherein the processor-executable instructions that, when executed by the one or more processors, cause the apparatus to cause the second network device to remove the second static IP address from the second network device, cause the apparatus to send, to the second network device, a signal to deprovision the second static IP address from the second network device.

14. The apparatus of claim 11, wherein the first static IP address and the second static IP address are the same.

15. The apparatus of claim 11, wherein the processor-executable instructions, when executed by the one or more processors, further cause the apparatus to receive, from the second network device, the second static IP address associated with the second network device.

16. The apparatus of claim 11, wherein the processor-executable instructions that, when executed by the one or more processors, cause the apparatus to determine the first static IP address conflicts with the second static IP address, cause the apparatus to determine, based on a comparison of the first static IP address to the second static IP address, the first static IP address is the same as the second static IP address.

17. The apparatus of claim 11, wherein the processor-executable instructions that, when executed by the one or more processors, cause the apparatus to receive the device identifier and the first static IP address, cause the apparatus to receive, from the first network device, a push notification comprising the device identifier and the first static IP address.

18. The apparatus of claim 11, wherein the first network device comprises a router.

19. The apparatus of claim 11, wherein the processor-executable instructions, when executed by the one or more processors, further cause the apparatus to:

determine, based on the device identifier, a size of a block associated with the first static IP address is incorrect; and cause, based on the size of the block being incorrect, the first network device to modify the size of the block associated with the first static IP address.

20. The apparatus of claim 11, wherein the processor-executable instructions, when executed by the one or more processors, further cause the apparatus to:

receive, from the first network device, an authentication key;

determine, based on the device identifier and the authentication key, the authentication key is incorrect; and cause, based on the authentication key being incorrect, the first network device to receive an updated authentication key.

21. One or more non-transitory computer-readable media storing processor-executable instructions that, when executed by at least one processor, cause the at least one processor to:

receive, from a first network device, a device identifier associated with the first network device and a first static internet protocol (IP) address associated with the first network device;

determine, based on the first static IP address, that the first static IP address conflicts with a second static IP address associated with a second network device;

determine, based on the device identifier, the first static IP address is assigned to the first network device; and cause, based on the first static IP address being assigned to the first network device, the second network device to remove the second static IP address from the second network device.

22. The one or more non-transitory computer-readable media of claim 21, wherein the device identifier comprises a MAC address.

23. The one or more non-transitory computer-readable media of claim 21, wherein the processor-executable instructions that, when executed by the at least one processor, cause the at least one processor to cause the second network device to remove the second static IP address from the second network device, cause the at least one processor to send, to the second network device, a signal to deprovision the second static IP address from the second network device.

24. The one or more non-transitory computer-readable media of claim 21, wherein the first static IP address and the second static IP address are the same.

25. The one or more non-transitory computer-readable media of claim 21, wherein the processor-executable instructions, when executed by the at least one processor, further cause the at least one processor to receive, from the second network device, the second static IP address associated with the second network device.

26. The one or more non-transitory computer-readable media of claim 21, wherein the processor-executable instructions that, when executed by the at least one processor, cause the at least one processor to determine the first static IP address conflicts with the second static IP address, cause the at least one processor to determine, based on a comparison of the first static IP address to the second static IP address, the first static IP address is the same as the second static IP address.

27. The one or more non-transitory computer-readable media of claim 21, wherein the processor-executable instructions that, when executed by the at least one processor, cause the at least one processor to receive the device identifier and the first static IP address, cause the at least one processor to receive, from the first network device, a push notification comprising the device identifier and the first static IP address.

28. The one or more non-transitory computer-readable media of claim 21, wherein the first network device comprises a router.

29. The one or more non-transitory computer-readable media of claim 21, wherein the processor-executable instructions, when executed by the at least one processor, further cause the at least one processor to:

determine, based on the device identifier, a size of a block associated with the first static IP address is incorrect; and cause, based on the size of the block being incorrect, the first network device to modify the size of the block associated with the first static IP address.

30. The one or more non-transitory computer-readable media of claim 21, wherein the processor-executable instructions, when executed by the at least one processor, further cause the at least one processor to:

receive, from the first network device, an authentication key;

determine, based on the device identifier and the authentication key, the authentication key is incorrect; and cause, based on the authentication key being incorrect, the first network device to receive an updated authentication key.

31. A system comprising:

a computing device configured to:

receive, from a first network device, a device identifier associated with the first network device and a first static internet protocol (IP) address associated with the first network device;

determine, based on the first static IP address, that the first static IP address conflicts with a second static IP address associated with a second network device;

determine, based on the device identifier, the first static IP address is assigned to the first network device; and cause, based on the first static IP address being assigned to the first network device, the second network device to remove the second static IP address from the second network device;

the first network device configured to:

send the device identifier associated with the first network device and the first static IP address associated with the first network device; and the second network device configured to:

remove the second static IP address from the second network device.

32. The system of claim 31, wherein the device identifier comprises a MAC address.

33. The system of claim 31, wherein to cause the second network device to remove the second static IP address from the second network device, the computing device is configured to send, to the second network device, a signal to deprovision the second static IP address from the second network device.

34. The system of claim 31, wherein the first static IP address and the second static IP address are the same.

35. The system of claim 31, wherein the computing device is further configured to receive, from the second network device, the second static IP address associated with the second network device.

36. The system of claim 31, wherein to determine the first static IP address conflicts with the second static IP address, the computing device is configured to determine, based on a comparison of the first static IP address to the second static IP address, the first static IP address is the same as the second static IP address.

37. The system of claim 31, wherein to receive the device identifier and the first static IP address, the computing device is configured to receive, from the first network device, a push notification comprising the device identifier and the first static IP address.

38. The system of claim 31, wherein the first network device comprises a router.

39. The system of claim 31, wherein the computing device is further configured to:

determine, based on the device identifier, a size of a block associated with the first static IP address is incorrect; and cause, based on the size of the block being incorrect, the first network device to modify the size of the block associated with the first static IP address.

40. The system of claim 31, wherein the computing device is further configured to:

receive, from the first network device, an authentication key;

determine, based on the device identifier and the authentication key, the authentication key is incorrect; and cause, based on the authentication key being incorrect, the first network device to receive an updated authentication key.

* * * * *